United States Patent
Ishikawa

(10) Patent No.: US 11,203,664 B2
(45) Date of Patent: Dec. 21, 2021

(54) POLYCARBONATE RESIN COMPOSITION AND MOLDED ARTICLE THEREOF

(71) Applicant: IDEMITSU KOSAN CO., LTD., Tokyo (JP)

(72) Inventor: Yasuhiro Ishikawa, Ichihara (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 40 days.

(21) Appl. No.: 16/638,449

(22) PCT Filed: Sep. 6, 2018

(86) PCT No.: PCT/JP2018/032957
§ 371 (c)(1),
(2) Date: Feb. 11, 2020

(87) PCT Pub. No.: WO2019/049916
PCT Pub. Date: Mar. 14, 2019

(65) Prior Publication Data
US 2020/0362104 A1 Nov. 19, 2020

(30) Foreign Application Priority Data
Sep. 6, 2017 (JP) .............................. JP2017-171476

(51) Int. Cl.
| | | |
|---|---|---|
| *C08G 64/10* | (2006.01) | |
| *C08G 64/04* | (2006.01) | |
| *C08G 63/183* | (2006.01) | |
| *C08G 64/08* | (2006.01) | |
| *C08G 64/18* | (2006.01) | |
| *C08K 5/20* | (2006.01) | |
| *C08L 83/06* | (2006.01) | |
| *C08L 83/08* | (2006.01) | |

(52) U.S. Cl.
CPC ......... *C08G 64/045* (2013.01); *C08G 63/183* (2013.01); *C08G 64/081* (2013.01); *C08G 64/10* (2013.01); *C08G 64/186* (2013.01); *C08K 5/20* (2013.01); *C08L 83/06* (2013.01); *C08L 83/08* (2013.01); *C08L 2203/20* (2013.01); *C08L 2205/03* (2013.01)

(58) Field of Classification Search
USPC .................... 528/196, 198, 271, 273, 274
See application file for complete search history.

(56) References Cited

FOREIGN PATENT DOCUMENTS

| | | |
|---|---|---|
| CN | 104479327 A | 4/2015 |
| JP | 2006-037031 A | 2/2006 |
| JP | 2010-132893 A | 6/2010 |
| JP | 2011-021127 A | 2/2011 |
| JP | 2011-246564 A | 12/2011 |
| JP | 2012-246390 A | 12/2012 |
| WO | WO-2009/037974 A1 | 3/2009 |
| WO | WO-2013/108836 A1 | 7/2013 |
| WO | WO-2014/017072 A1 | 1/2014 |
| WO | WO-2015/033295 A1 | 3/2015 |
| WO | WO-2017/109591 A1 | 6/2017 |
| WO | WO-2017/110754 A1 | 6/2017 |
| WO | WO2017110754 * | 6/2017 ............. C08G 64/00 |
| WO | WO-2017/154902 A1 | 9/2017 |
| WO | WO-2017/154903 A1 | 9/2017 |

OTHER PUBLICATIONS

Polycarbonate-based resin composition and molded article thereof Inventor: Yasuhiro, Mogi WO2017110754A1 Translation: Polycarbonate-based resin composition and molded article thereof; Jun. 29, 2017 (Year: 2017).*

International Searching Authority, "International Search Report," issued in connection with International Patent Application No. PCT/JP2018/032957, dated Nov. 27, 2018.

International Searching Authority, "Written Opinion," issued in connection with International Patent Application No. PCT/JP2018/032957, dated Nov. 27, 2018.

Office Action dated Apr. 27, 2021 for corresponding Japanese Patent Application No. 2017-171476.

* cited by examiner

*Primary Examiner* — Terressa Boykin
(74) *Attorney, Agent, or Firm* — Foley & Lardner LLP

(57) ABSTRACT

Provided is a polycarbonate-based resin composition, including: 50 mass % or more to 99 mass % or less of a polycarbonate-based resin (S) containing 0.1 mass % or more to 100 mass % or less of a polycarbonate-polyorganosiloxane copolymer (A), which contains a polycarbonate block (A-1) formed of a specific repeating unit and a polyorganosiloxane block (A-2) containing a specific repeating unit, and 0 mass % or more to 99.9 mass % or less of an aromatic polycarbonate-based resin (B) except the polycarbonate-polyorganosiloxane copolymer (A); 1 mass % or more to 50 mass % or less of a polyester-based resin (C); and 0.001 part by mass or more to 1 part by mass or less of an amide compound (D) with respect to 100 parts by mass of a total amount of the polycarbonate-based resin (S) and the polyester-based resin (C).

22 Claims, No Drawings

POLYCARBONATE RESIN COMPOSITION AND MOLDED ARTICLE THEREOF

CROSS-REFERENCE TO RELATED APPLICATIONS

The present application claims priority under 37 U.S.C. § 371 to International Patent Application No. PCT/JP2018/032957, filed Sep. 6, 2018, which claims priority to and the benefit of Japanese Patent Application No. 2017-171476, filed on Sep. 6, 2017. The contents of these applications are hereby incorporated by reference in their entireties.

TECHNICAL FIELD

The present invention relates to a polycarbonate-based resin composition, and a molded article thereof.

BACKGROUND ART

A polycarbonate-based resin (hereinafter sometimes abbreviated as "PC resin") containing a polycarbonate-polyorganosiloxane copolymer (hereinafter sometimes abbreviated as "PC-POS copolymer") has been attracting attention because of its excellent properties, such as high impact resistance and high flame retardancy. Accordingly, the resin has started to find use in a wide variety of applications including: exterior and internal parts for parts for electrical and electronic equipment; exterior and internal parts for an automobile, a railway vehicle, a ship, an aircraft, equipment for space industry, or medical equipment; and a part for a building material.

To further improve the impact resistance of the polycarbonate-based resin containing the polycarbonate-polyorganosiloxane copolymer, as described in, for example, each of Patent Documents 1 and 2, an approach to using a long-chain polyorganosiloxane has been used.

CITATION LIST

Patent Document

Patent Document 1: JP 2011-21127 A
Patent Document 2: JP 2012-246390 A

SUMMARY OF INVENTION

Technical Problem

The polycarbonate-polyorganosiloxane copolymers of Patent Documents 1 and 2 are each excellent in impact resistance, but it has been required to obtain a polycarbonate-based resin composition having more excellent impact resistance.

Solution to Problem

The inventor of the present invention has made an investigation with a view to obtaining a polycarbonate-based resin composition having impact resistance more excellent than that of a related-art polycarbonate resin composition. As a result, the inventor has found that a polycarbonate-based resin composition including specific amounts of a polycarbonate-based resin containing a specific polycarbonate-polyorganosiloxane copolymer, a polyester-based resin, and an amide compound solves the above-mentioned problem.

That is, the present invention relates to the following items [1] to [23].

[1] A polycarbonate-based resin composition, comprising:
50 mass % or more to 99 mass % or less of a polycarbonate-based resin (S) containing 0.1 mass % or more to 100 mass % or less of a polycarbonate-polyorganosiloxane copolymer (A), which contains a polycarbonate block (A-1) formed of a repeating unit represented by the following general formula (I) and a polyorganosiloxane block (A-2) containing a repeating unit represented by the following general formula (II), and 0 mass % or more to 99.9 mass % or less of an aromatic polycarbonate-based resin (B) except the polycarbonate-polyorganosiloxane copolymer (A);
1 mass % or more to 50 mass % or less of a polyester-based resin (C); and
0.001 part by mass or more to 1 part by mass or less of an amide compound (D) with respect to 100 parts by mass of a total amount of the polycarbonate-based resin (S) and the polyester-based resin (C):

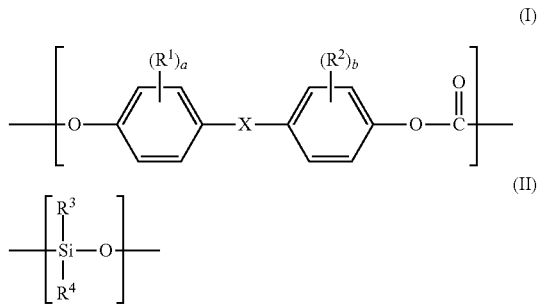

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4.

[2] The polycarbonate-based resin composition according to the above-mentioned item [1], wherein the polyorganosiloxane block (A-2) has an average chain length of from 20 or more to 500 or less.

[3] The polycarbonate-based resin composition according to the above-mentioned item [1] or [2], wherein a content of the polyorganosiloxane block (A-2) in the polycarbonate-polyorganosiloxane copolymer (A) is from 1 mass % or more to 50 mass % or less.

[4] The polycarbonate-based resin composition according to any one of the above-mentioned items [1] to [3], wherein a content of the polyorganosiloxane block (A-2) in the polycarbonate-based resin (S) is from 0.1 mass % or more to 10 mass % or less.

[5] The polycarbonate-based resin composition according to any one of the above-mentioned items [1] to [4], wherein a content of the polyorganosiloxane block (A-2) in the polycarbonate-based resin composition is from 0.1 mass % or more to 10 mass % or less.

[6] The polycarbonate-based resin composition according to any one of the above-mentioned items [1] to [5], wherein the polycarbonate-polyorganosiloxane copolymer (A) has a viscosity-average molecular weight (Mv) of from 9,000 or more to 50,000 or less.

[7] The polycarbonate-based resin composition according to any one of the above-mentioned items [1] to [6], wherein the polycarbonate-based resin (S) has a viscosity-average molecular weight (Mv) of from 9,000 or more to 50,000 or less.

[8] The polycarbonate-based resin composition according to any one of the above-mentioned items [1] to [7], wherein the polyorganosiloxane block (A-2) has a unit represented by any one of the following general formulae (II-I) to (II-III):

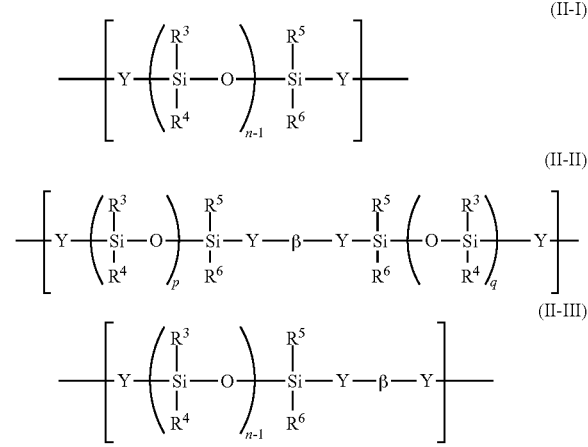

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$, or $R^6$ may be identical to or different from each other, Y represents —$R^7$O—, —$R^7$COO—, —$R^7$NH—, —$R^7NR^8$—, —COO—, —S—, —$R^7$COO—$R^9$—O—, or —$R^7$O—$R^{10}$—O—, and a plurality of Y may be identical to or different from each other, the $R^7$ represents a single bond, a linear, branched, or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, β represents a divalent group derived from a diisocyanate compound, or a divalent group derived from a dicarboxylic acid or a halide of a dicarboxylic acid, "n" represents a chain length of a polyorganosiloxane and needs to be from 20 or more to 500 or less, and n−1, and "p" and "q" each represent a number of repetitions of a polyorganosiloxane unit and each represent an integer of 1 or more, and a sum of "p" and "q" is n−2.

[9] The polycarbonate-based resin composition according to any one of the above-mentioned items [1] to [8], wherein the aromatic polycarbonate-based resin (B) contains a polycarbonate block including, in a main chain thereof, a repeating unit represented by the following general formula (III):

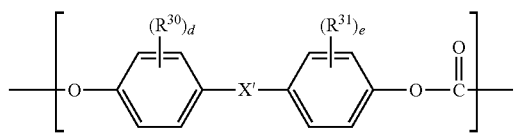

wherein $R^{30}$ and $R^{31}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and "d" and "e" each independently represent an integer of from 0 to 4.

[10] The polycarbonate-based resin composition according to any one of the above-mentioned items [1] to [9], wherein the polyester-based resin (C) is a polybutylene terephthalate.

[11] The polycarbonate-based resin composition according to any one of the above-mentioned items [1] to [10], wherein an amount of titanium in the polyester-based resin (C) is 120 ppm by mass or less.

[12] The polycarbonate-based resin composition according to any one of the above-mentioned items [1] to [11], wherein an amount of tin in the polyester-based resin (C) is 50 ppm by mass or less.

[13] The polycarbonate-based resin composition according to any one of the above-mentioned items [1] to [12], wherein the amide compound (D) is a compound represented by the following general formula (IV):

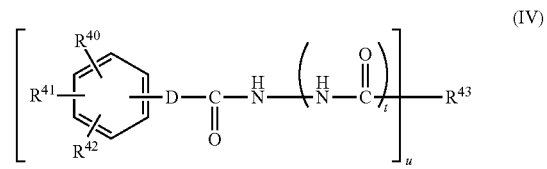

wherein, in the formula (IV), $R^{40}$, $R^{41}$ and $R^{42}$ each independently represent a hydrogen atom, a hydroxyl group, a linear or branched alkyl group having 1 to 8 carbon atoms, an alkoxy group having 1 to 8 carbon atoms, or an aryl group having 6 to 18 carbon atoms, or $R^{40}$, $R^{41}$, and $R^{42}$ are bonded to each other to represent a cyclic structure, provided that a number of carbon atoms of the cyclic structure is from 10 to 18 in terms of total number of carbon atoms of a fused ring, D represents a single bond or an alkylene group having 1 to 20 carbon atoms, $R^{43}$ represents a single bond, or a substituted or unsubstituted hydrocarbon group or heterocyclic group having 1 to 30 carbon atoms, and when $R^{43}$ represents a single bond, the single bond may be bonded to an aromatic ring to which D is bonded to form a ring, "t" represents 0 or 1, and "u" represents from 1 to 3, and when "u" represents 2 or more, the compound has a symmetric or asymmetric structure with respect to $R^{43}$.

[14] The polycarbonate-based resin composition according to the above-mentioned items [1] to [13], wherein the amide compound (D) is a compound represented by the following general formula (V), (VI), or (VII):

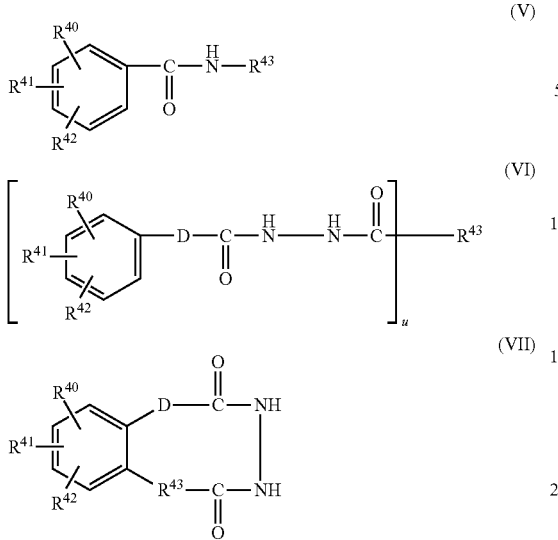

wherein, in the formulae (V) to (VII), $R^{40}$, $R^{41}$, and $R^{42}$ each independently represent a hydrogen atom, a hydroxyl group, a linear or branched alkyl group having 1 to 8 carbon atoms, an alkoxy group having 1 to 8 carbon atoms, or an aryl group having 6 to 18 carbon atoms, or $R^{40}$, $R^{41}$, and $R^{42}$ are bonded to each other to represent a cyclic structure, provided that a number of carbon atoms of the cyclic structure is from 10 to 18 in terms of total number of carbon atoms of a fused ring, D represents a single bond or an alkylene group having 1 to 20 carbon atoms, $R^{43}$ represents a single bond, or a substituted or unsubstituted hydrocarbon group or heterocyclic group having 1 to 30 carbon atoms, and "u" represents from 1 to 3, and when "u" represents 2 or more, the compound has a symmetric or asymmetric structure with respect to $R^{43}$.

[15] The polycarbonate-based resin composition according to the above-mentioned item [14], wherein the amide compound (D) is a compound represented by the general formula (VI).

[16] The polycarbonate-based resin composition according to any one of the above-mentioned items [1] to [14], wherein the amide compound (D) is 1,10-decanedicarboxylic acid di(N'-salicyloylhydrazide).

[17] The polycarbonate-based resin composition according to any one of the above-mentioned items [1] to [14], wherein the amide compound (D) is 3-(N-salicyloyl)amino-1H-1,2,4-triazole.

[18] The polycarbonate-based resin composition according to any one of the above-mentioned items [1] to [14], wherein the amide compound (D) is phthalic acid hydrazide.

[19] The polycarbonate-based resin composition according to any one of the above-mentioned items [1] to [18], wherein the polycarbonate-based resin composition has a notched Izod impact strength at 23° C. of 70 kJ/m² or more, which is measured in conformity with ASTM Standard D-256.

[20] A molded article, which is obtained by molding the polycarbonate-based resin composition of any one of the above-mentioned items [1] to [19].

[21] The molded article according to the above-mentioned item [20], wherein the molded article has a notched Izod impact strength at 23° C. of 70 kJ/m² or more, which is measured in conformity with ASTM Standard D-256.

[22] The molded article according to the above-mentioned item [20] or [21], wherein the molded article is exterior and internal parts for parts for electrical and electronic equipment.

[23] The molded article according to the above-mentioned item [20] or [21], wherein the molded article is parts for an automobile and a building material.

Advantageous Effects of Invention

According to the present invention, the polycarbonate-based resin composition having impact resistance more excellent than that of a related-art polycarbonate resin composition, and the molded article thereof can be obtained.

DESCRIPTION OF EMBODIMENTS

The inventor of the present invention has made extensive investigations, and as a result, has found the following surprising result. It has been found that, when the resin structure of the present invention is adopted, extremely excellent impact resistance is obtained. Detailed description is given below.

The term "XX to YY" as used herein means "from XX or more to YY or less." In this description, a specification considered to be preferred may be arbitrarily adopted, and a combination of preferred specifications is more preferred.

A polycarbonate-based resin composition of the present invention is characterized by including: 50 mass % or more to 99 mass % or less of a polycarbonate-based resin (S) containing 0.1 mass % or more to 100 mass % or less of a polycarbonate-polyorganosiloxane copolymer (A), which contains a polycarbonate block (A-1) formed of a specific repeating unit and a polyorganosiloxane block (A-2) containing a specific repeating unit, and 0 mass % or more to 99.9 mass % or less of an aromatic polycarbonate-based resin (B) except the polycarbonate-polyorganosiloxane copolymer (A); 1 mass % or more to 50 mass % or less of a polyester-based resin (C); and 0.001 part by mass or more to 1 part by mass or less of an amide compound (D) with respect to 100 parts by mass of the total amount of the polycarbonate-based resin (S) and the polyester-based resin (C).

Polycarbonate-Polyorganosiloxane Copolymer (A)

The polycarbonate-polyorganosiloxane copolymer (A) to be incorporated into the polycarbonate-based resin composition of the present invention contains a polycarbonate block (A-1) formed of a repeating unit represented by the following general formula (I) and a polyorganosiloxane block (A-2) containing a repeating unit represented by the following general formula (II):

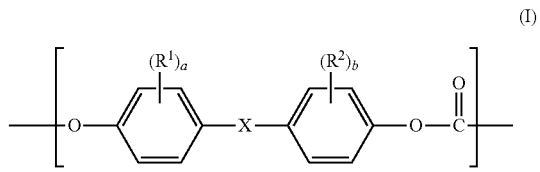

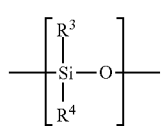

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4.

In the general formula (I), examples of the halogen atom that $R^1$ and $R^2$ each independently represent include a fluorine atom, a chlorine atom, a bromine atom, and an iodine atom.

Examples of the alkyl group that $R^1$ and $R^2$ each independently represent include a methyl group, an ethyl group, a n-propyl group, an isopropyl group, various butyl groups (the term "various" means that a linear group and all kinds of branched groups are included, and in this description, the same holds true for the following), various pentyl groups, and various hexyl groups. Examples of the alkoxy group that $R^1$ and $R^2$ each independently represent include alkoxy groups having the above-mentioned alkyl groups as alkyl group moieties.

Examples of the alkylene group represented by X include a methylene group, an ethylene group, a trimethylene group, a tetramethylene group, and a hexamethylene group. Among them, an alkylene group having 1 to 5 carbon atoms is preferred. Examples of the alkylidene group represented by X include an ethylidene group and an isopropylidene group. Examples of the cycloalkylene group represented by X include a cyclopentanediyl group, a cyclohexanediyl group, and a cyclooctanediyl group. Among them, a cycloalkylene group having 5 to 10 carbon atoms is preferred. Examples of the cycloalkylidene group represented by X include a cyclohexylidene group, a 3,5,5-trimethylcyclohexylidene group, and a 2-adamantylidene group. Among them, a cycloalkylidene group having 5 to 10 carbon atoms is preferred, and a cycloalkylidene group having 5 to 8 carbon atoms is more preferred. Examples of the aryl moiety of the arylalkylene group represented by X include aryl groups each having 6 to 14 ring-forming carbon atoms, such as a phenyl group, a naphthyl group, a biphenyl group, and an anthryl group, and examples of the alkylene group include the above-mentioned alkylene groups. Examples of the aryl moiety of the arylalkylidene group represented by X include aryl groups each having 6 to 14 ring-forming carbon atoms, such as a phenyl group, a naphthyl group, a biphenyl group, and an anthryl group, and examples of the alkylidene group may include the above-mentioned alkylidene groups.

Symbols "a" and "b" each independently represent an integer of from 0 to 4, preferably from 0 to 2, more preferably 0 or 1.

Among them, a repeating unit in which "a" and "b" each represent 0, and X represents a single bond or an alkylene group having 1 to 8 carbon atoms, or a repeating unit in which "a" and "b" each represent 0, and X represents an alkylene group having 3 carbon atoms, in particular an isopropylidene group is suitable.

In the general formula (II), examples of the halogen atom represented by $R^3$ or $R^4$ include a fluorine atom, a chlorine atom, a bromine atom, and an iodine atom. Examples of the alkyl group represented by $R^3$ or $R^4$ include a methyl group, an ethyl group, a n-propyl group, an isopropyl group, various butyl groups, various pentyl groups, and various hexyl groups. Examples of the alkoxy group represented by $R^3$ or $R^4$ include alkoxy groups having the above-mentioned alkyl groups as alkyl group moieties. Examples of the aryl group represented by $R^3$ or $R^4$ include a phenyl group and a naphthyl group.

$R^3$ and $R^4$ each preferably represent a hydrogen atom, an alkyl group having 1 to 6 carbon atoms, an alkoxy group having 1 to 6 carbon atoms, or an aryl group having 6 to 12 carbon atoms, and each more preferably represent a methyl group.

More specifically, the polyorganosiloxane block (A-2) containing the repeating unit represented by the general formula (II) preferably has a unit represented by any one of the following general formulae (II-I) to (II-III):

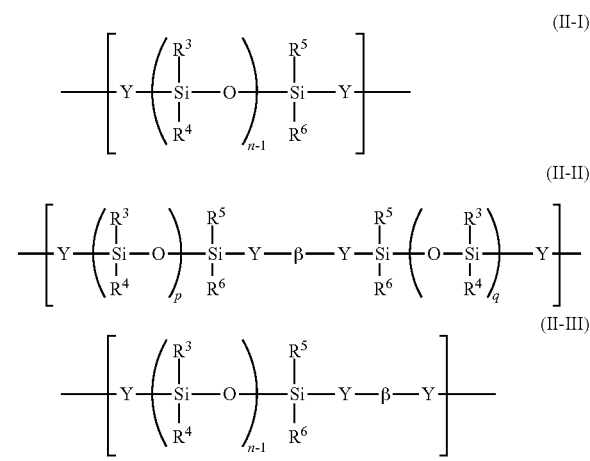

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$, or $R^6$ may be identical to or different from each other, Y represents —$R^7$O—, —$R^7$COO—, —$R^7$NH—, —$R^7$NR$^8$—, —COO—, —S—, —$R^7$COO—$R^9$—O—, or —$R^7$O—$R^{10}$—O—, and a plurality of Y may be identical to or different from each other, the $R^7$ represents a single bond, a linear, branched, or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, β represents a divalent group derived from a diisocyanate compound, or a divalent group derived from a dicarboxylic acid or a halide of a dicarboxylic acid, "n" represents the chain length of the polyorganosiloxane and needs to be from 20 or more to 500 or less, and n–1, and "p" and "q" each represent the number of repetitions of a polyorganosiloxane unit and each represent an integer of 1 or more, and the sum of "p" and "q" is n–2.

Examples of the halogen atom that $R^3$ to $R^6$ each independently represent include a fluorine atom, a chlorine atom, a bromine atom, and an iodine atom. Examples of the alkyl group that $R^3$ to $R^6$ each independently represent include a methyl group, an ethyl group, a n-propyl group, an isopropyl group, various butyl groups, various pentyl groups, and various hexyl groups. Examples of the alkoxy group that $R^3$ to $R^6$ each independently represent include alkoxy groups having the above-mentioned alkyl groups as alkyl group moieties. Examples of the aryl group that $R^3$ to $R^6$ each independently represent include a phenyl group and a naphthyl group.

$R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms. Among them, $R^3$ to $R^6$ in the general formula (II-I), the general formula (II-II), and/or the general formula (II-III) each preferably represent a methyl group.

The linear or branched alkylene group represented by $R^7$ in —$R^7$O—, —$R^7$COO—, —$R^7$NH—, —$R^7$NR$^8$—, —$R^7$COO—$R^9$—O—, or —$R^7$O—$R^{10}$—O— represented by Y is, for example, an alkylene group having 1 to 8 carbon atoms, preferably 1 to 5 carbon atoms. The cyclic alkylene group represented by $R^7$ is, for example, a cycloalkylene group having 5 to 15 carbon atoms, preferably 5 to 10 carbon atoms.

The aryl-substituted alkylene group represented by $R^7$ may have a substituent, such as an alkoxy group or an alkyl group, on its aromatic ring, and a specific structure thereof may be, for example, a structure represented by the following general formula (i) or (ii). Herein, when $R^7$ represents the aryl-substituted alkylene group, the alkylene group is bonded to Si.

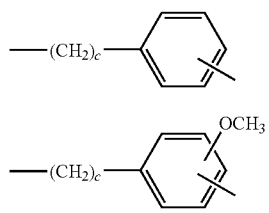

wherein "c" represents a positive integer and typically represents an integer of from 1 to 6.

The diarylene group represented by any one of $R^7$, $R^9$, and $R^{10}$ refers to a group in which two arylene groups are linked to each other directly or through a divalent organic group, and is specifically a group having a structure represented by —$Ar^1$—W—$Ar^2$—. $Ar^1$ and $Ar^2$ each represent an arylene group, and W represents a single bond or a divalent organic group. Examples of the divalent organic group represented by W may include an isopropylidene group, a methylene group, a dimethylene group, and a trimethylene group.

Examples of the arylene group represented by any one of $R^7$, $Ar^1$, and $Ar^2$ include arylene groups each having 6 to 14 ring-forming carbon atoms, such as a phenylene group, a naphthylene group, a biphenylene group, and an anthrylene group. Those arylene groups may each further have an arbitrary substituent, such as an alkoxy group or an alkyl group.

The alkyl group represented by $R^8$ is a linear or branched group having 1 to 8, preferably 1 to 5 carbon atoms. The alkenyl group represented by $R^8$ is, for example, a linear or branched group having 2 to 8, preferably 2 to 5 carbon atoms. Examples of the aryl group represented by $R^8$ include a phenyl group and a naphthyl group. Examples of the aralkyl group represented by $R^8$ include a phenylmethyl group and a phenylethyl group.

The linear, branched, or cyclic alkylene group represented by $R^{10}$ is the same as that represented by $R^7$.

Y preferably represents —$R^7$O—. $R^7$ preferably represents an aryl-substituted alkylene group, in particular a residue of a phenol-based compound having an alkyl group, and more preferably represents an organic residue derived from allylphenol or an organic residue derived from eugenol.

With regard to "p" and "q" in the formula (II-II), it is preferred that p=q.

In addition, β represents a divalent group derived from a diisocyanate compound, or a divalent group derived from a dicarboxylic acid or a halide of a dicarboxylic acid, and examples thereof include divalent groups represented by the following general formulae (iii) to (vii).

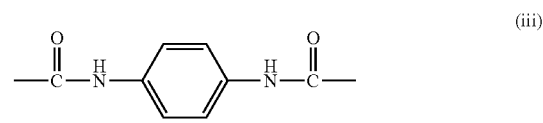

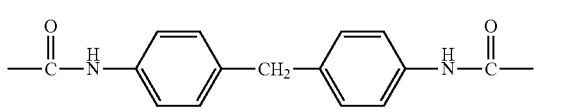

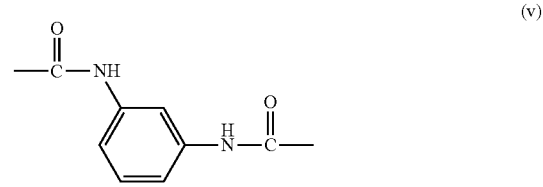

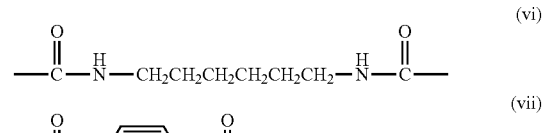

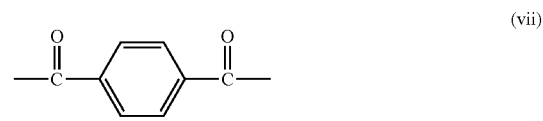

The average chain length "n" of the polyorganosiloxane block (A-2) is preferably from 20 or more to 500 or less. That is, "n" in each of the formulae (II-I) and (II-III) is from 20 or more to 500 or less, and in the case of the formula (II-II), a number obtained by adding 2 to the sum of "p" and "q" preferably falls within the range.

The average chain length is calculated by nuclear magnetic resonance (NMR) measurement. When the average chain length of the polycarbonate-polyorganosiloxane copolymer (A) is from 20 or more to 500 or less, the polycarbonate-based resin composition to be finally obtained is more excellent in impact resistance and the like. The inventor has found that the polycarbonate-based resin composition of the present invention has extremely excellent impact resistance, though a reason therefor is unclear.

The average chain length of the polyorganosiloxane block (A-2) is preferably 30 or more, more preferably 35 or more, still more preferably 40 or more, still further more preferably 55 or more, particularly preferably 60 or more, most preferably 80 or more. In addition, the average chain length is preferably 400 or less, more preferably 300 or less, still more preferably 100 or less, particularly preferably 95 or less.

The content of the polyorganosiloxane block (A-2) in the PC-POS copolymer (A) is preferably from 1 mass % or more to 50 mass % or less. When the content of the polyorganosiloxane block in the PC-POS copolymer (A) falls within the range, more excellent impact resistance can be obtained.

The content of the polyorganosiloxane block (A-2) in the PC-POS copolymer (A) is more preferably 2 mass % or more, still more preferably 3 mass % or more, particularly preferably 4 mass % or more, and is preferably 40 mass % or less, more preferably 25 mass % or less, still more preferably 15 mass % or less, particularly preferably 8 mass % or less.

The viscosity-average molecular weight (Mv) of the PC-POS copolymer (A) may be appropriately adjusted by using, for example, a molecular weight modifier (terminal stopper) so as to be a target molecular weight in accordance with applications or products in which the copolymer is used. The viscosity-average molecular weight of the PC-POS copolymer (A) is preferably from 9,000 or more to 50,000 or less. When the viscosity-average molecular weight is 9,000 or more, a molded article having higher strength can be obtained. When the viscosity-average molecular weight is 50,000 or less, injection molding or extrusion molding can be more easily performed at the temperature at which the heat deterioration of the copolymer does not occur.

The viscosity-average molecular weight of the PC-POS copolymer (A) is more preferably 12,000 or more, still more preferably 14,000 or more, particularly preferably 16,000 or more, and is more preferably 30,000 or less, still more preferably 23,000 or less, particularly preferably 22,000 or less, most preferably 20,000 or less.

The viscosity-average molecular weight (Mv) is a value calculated from the following Schnell's equation by measuring the limiting viscosity [η] of a methylene chloride solution at 20° C.

$[\eta] = 1.23 \times 10^{-5} \times Mv^{0.83}$

The polycarbonate-polyorganosiloxane copolymer (A) may be produced by a known production method, such as an interfacial polymerization method (phosgene method), a pyridine method, or an ester exchange method. Particularly when the interfacial polymerization method is adopted, a step of separating an organic phase containing the PC-POS copolymer (A) and an aqueous phase containing an unreacted product, a catalyst residue, or the like becomes easier, and hence the separation of the organic phase containing the PC-POS copolymer (A) and the aqueous phase in each washing step based on, for example, alkali washing, acid washing, or pure water washing becomes easier. Accordingly, the PC-POS copolymer (A) is efficiently obtained. With regard to a method of producing the PC-POS copolymer (A), reference may be made to, for example, a method described in JP 2014-80462 A.

Specifically, the PC-POS copolymer (A) may be produced by: dissolving a polycarbonate oligomer produced in advance to be described later and a polyorganosiloxane in a water-insoluble organic solvent (e.g., methylene chloride); adding a solution of a dihydric phenol-based compound (e.g., bisphenol A) in an aqueous alkali compound (e.g., aqueous sodium hydroxide) to the solution; and subjecting the mixture to an interfacial polycondensation reaction through the use of a tertiary amine (e.g., triethylamine) or a quaternary ammonium salt (e.g., trimethylbenzylammonium chloride) as a polymerization catalyst in the presence of a terminal stopper (a monohydric phenol, such as p-t-butylphenol). In addition, the PC-POS copolymer (A) may also be produced by copolymerizing the polyorganosiloxane and a dihydric phenol, and phosgene, a carbonate ester, or a chloroformate.

A polyorganosiloxane represented by the following general formula (1), general formula (2), and/or general formula (3) may be used as the polyorganosiloxane serving as a raw material:

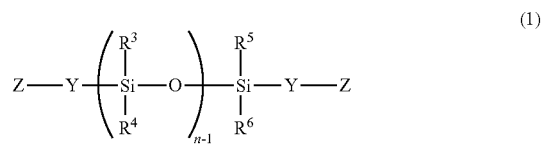

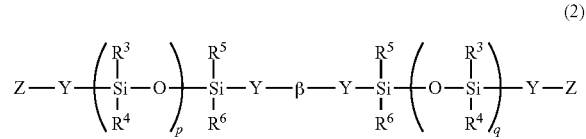

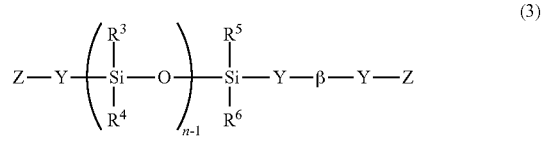

wherein $R^3$ to $R^6$, Y, β, n–1, "p", and "q" are as described above, and specific examples and preferred examples thereof are also the same as those described above, and Z represents a hydrogen atom or a halogen atom, and a plurality of Z may be identical to or different from each other.

Examples of the polyorganosiloxane represented by the general formula (1) include compounds each represented by any one of the following general formulae (1-1) to (1-11):

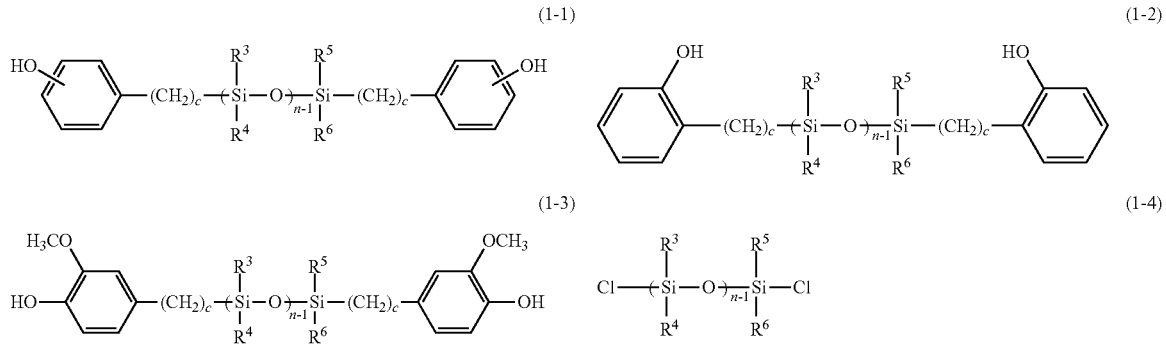

-continued

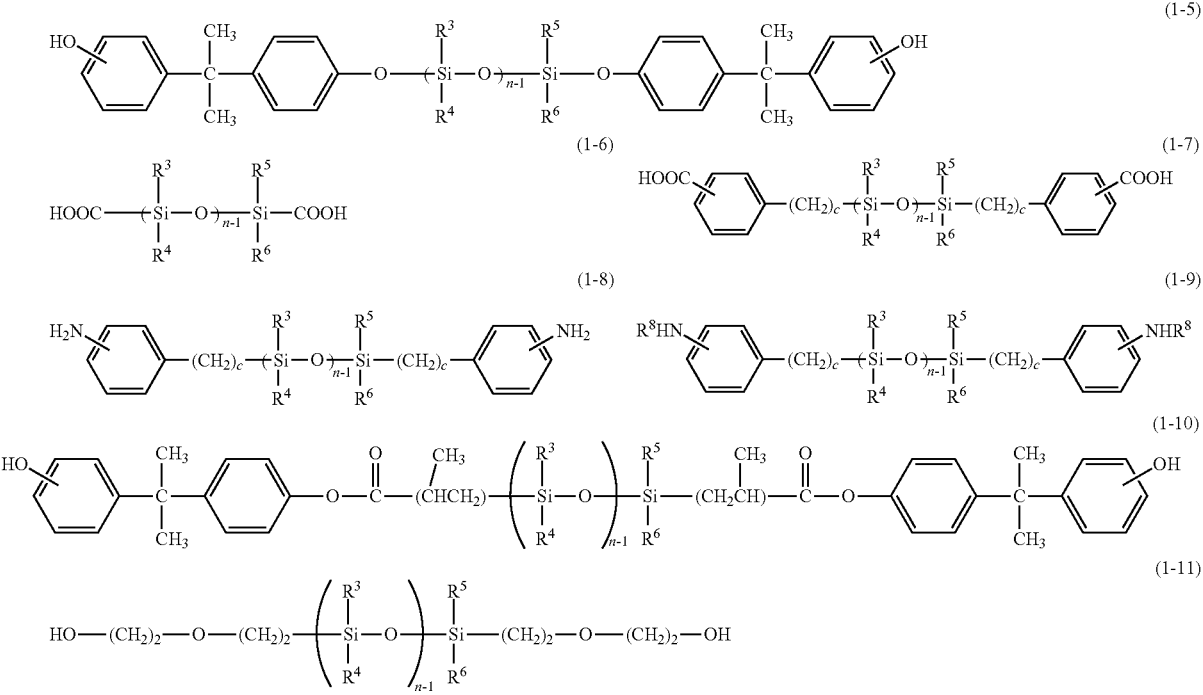

wherein in the general formulae (1-1) to (1-11), $R^3$ to $R^6$, "n", and $R^8$ are as defined above, and preferred examples thereof are also the same as those described above, and "c" represents a positive integer and typically represents an integer of from 1 to 6.

Among them, a phenol-modified polyorganosiloxane represented by the general formula (1-1) is preferred from the viewpoint of its ease of polymerization. In addition, an α,ω-bis[3-(o-hydroxyphenyl)propyl]polydimethylsiloxane, which is one compound represented by the general formula (1-2), or an α,ωco-bi s[3-(4-hydroxy-3-methoxyphenyl)propyl]polydimethylsiloxane, which is one compound represented by the general formula (1-3), is preferred from the viewpoint of its ease of availability.

In addition to the foregoing, a compound having a structure represented by the following general formula (4) may be used as a polyorganosiloxane raw material:

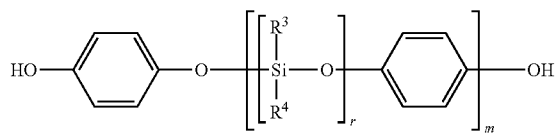

(4)

wherein $R^3$ and $R^4$ are identical to those described above. The average chain length of the polyorganosiloxane block represented by the general formula (4) is (r×m), and the range of the (r×m) is the same as that of the "n".

When the compound represented by the general formula (4) is used as a polyorganosiloxane raw material, the polyorganosiloxane block (A-2) preferably has a unit represented by the following general formula (II-IV):

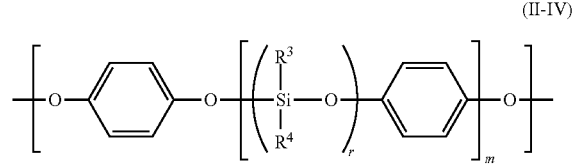

(II-IV)

wherein $R^3$, $R^4$, "r", and "m" are as described above.

The copolymer may include a structure represented by the following general formula (II-V) as the polyorganosiloxane block (A-2):

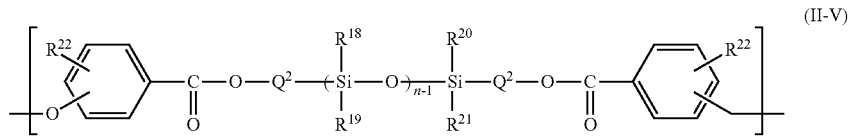

(II-V)

wherein $R^{18}$ to $R^{21}$ each independently represent a hydrogen atom or an alkyl group having 1 to 13 carbon atoms, $R^{22}$ represents an alkyl group having 1 to 6 carbon atoms, a hydrogen atom, a halogen atom, a hydroxy group, an alkoxy group having 1 to 6 carbon atoms, or an aryl group having 6 to 14 carbon atoms, $Q^2$ represents a divalent aliphatic group having 1 to 10 carbon atoms, and "n" represents an average chain length and is as described above.

In the general formula (II-V), examples of the alkyl group having 1 to 13 carbon atoms that $R^{18}$ to $R^{21}$ each independently represent include a methyl group, an ethyl group, a n-propyl group, an isopropyl group, various butyl groups, various pentyl groups, various hexyl groups, various heptyl groups, various octyl groups, a 2-ethylhexyl group, various nonyl groups, various decyl groups, various undecyl groups, various dodecyl groups, and various tridecyl groups. Among them, $R^{18}$ to $R^{21}$ each preferably represent a hydrogen atom or an alkyl group having 1 to 6 carbon atoms, and it is more preferred that all of $R^{18}$ to $R^{21}$ each represent a methyl group.

Examples of the alkyl group having 1 to 6 carbon atoms represented by $R^{22}$ include a methyl group, an ethyl group, a n-propyl group, an isopropyl group, various butyl groups, various pentyl groups, and various hexyl groups. Examples of the halogen atom represented by $R^{22}$ include a fluorine atom, a chlorine atom, a bromine atom, and an iodine atom. An example of the alkoxy group having 1 to 6 carbon atoms represented by $R^{22}$ is an alkoxy group whose alkyl group moiety is the alkyl group described above. Examples of the aryl group having 6 to 14 carbon atoms represented by $R^{22}$ include a phenyl group, a toluyl group, a dimethylphenyl group, and a naphthyl group.

Among them, $R^{22}$ preferably represents a hydrogen atom or an alkoxy group having 1 to 6 carbon atoms, more preferably represents a hydrogen atom or an alkoxy group having 1 to 3 carbon atoms, and still more preferably represents a hydrogen atom.

The divalent aliphatic group having 1 to 10 carbon atoms represented by $Q^2$ is preferably a linear or branched divalent saturated aliphatic group having 1 or more to 10 or less carbon atoms. The number of carbon atoms of the saturated aliphatic group is preferably from 1 or more to 8 or less, more preferably from 2 or more to 6 or less, still more preferably from 3 or more to 6 or less, still further more preferably from 4 or more to 6 or less. The average chain length "n" is as described above.

A preferred mode of the constituent unit (II-V) may be, for example, a structure represented by the following general formula (II-VI):

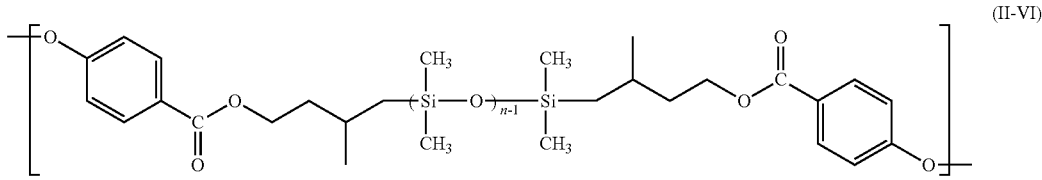

(II-VI)

wherein "n" is as described above.

The polyorganosiloxane block (A-2) represented by the general formula (II-V) or (II-VI) may be obtained by using a polyorganosiloxane raw material represented by the following general formula (5) or (6):

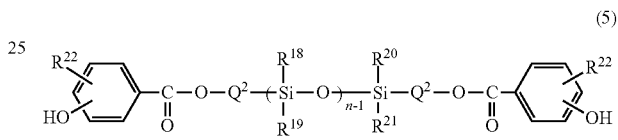

(5)

wherein $R^{18}$ to $R^{22}$, $Q^2$, and "n" are as described above;

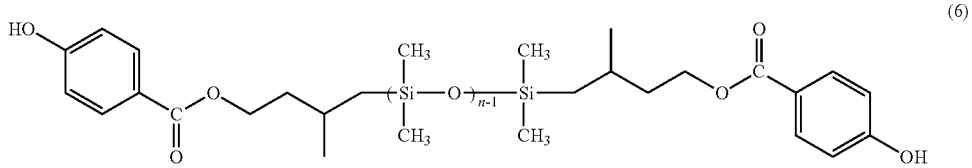

(6)

wherein "n" is as described above.

A method of producing the polyorganosiloxane is not particularly limited. According to, for example, a method described in JP 11-217390 A, a crude polyorganosiloxane may be obtained by: causing cyclotrisiloxane and disiloxane to react with each other in the presence of an acid catalyst to synthesize α,ω-dihydrogen organopentasiloxane; and then subjecting the α,ω-dihydrogen organopentasiloxane to an addition reaction with, for example, a phenolic compound (e.g., 2-allylphenol, 4-allylphenol, eugenol, or 2-propenylphenol) in the presence of a catalyst for a hydrosilylation reaction. In addition, according to a method described in JP 2662310 B2, the crude polyorganosiloxane may be obtained by: causing octamethylcyclotetrasiloxane and tetramethyldisiloxane to react with each other in the presence of sulfuric acid (acid catalyst); and subjecting the resultant α,ω-dihydrogen organopolysiloxane to an addition reaction with the phenolic compound or the like in the presence of the catalyst for a hydrosilylation reaction in the same manner as that described above. The α,ω-dihydrogen organopolysiloxane may be used after its chain length "n" has been appropriately adjusted in accordance with its polymerization conditions, or a commercial α,ω-dihydrogen organopolysiloxane may be used. Specifically, a polyorganosiloxane described in JP 2016-098292 A may be used.

The polycarbonate oligomer may be produced by a reaction between a dihydric phenol and a carbonate precursor, such as phosgene or triphosgene, in an organic solvent, such as methylene chloride, chlorobenzene, or chloroform. When the polycarbonate oligomer is produced by using an ester exchange method, the oligomer may be produced by a reaction between the dihydric phenol and a carbonate precursor, such as diphenyl carbonate.

A dihydric phenol represented by the following general formula (viii) is preferably used as the dihydric phenol:

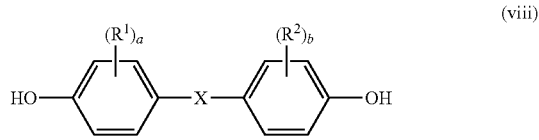

(viii)

wherein $R^1$, $R^2$, "a", "b", and X are as described above.

Examples of the dihydric phenol represented by the general formula (viii) include: bis(hydroxyphenyl)alkane-based dihydric phenols, such as 2,2-bis(4-hydroxyphenyl)propane [bisphenol A], bis(4-hydroxyphenyl)methane, 1,1-bis(4-hydroxyphenyl)ethane, and 2,2-bis(4-hydroxy-3,5-dimethylphenyl)propane; 4,4'-dihydroxydiphenyl; bis(4-hydroxyphenyl)cycloalkanes; bis(4-hydroxyphenyl) oxide; bis(4-hydroxyphenyl) sulfide; bis(4-hydroxyphenyl) sulfone; bis(4-hydroxyphenyl) sulfoxide; and bis(4-hydroxyphenyl) ketone. Those dihydric phenols may be used alone or as a mixture thereof.

Among them, bis(hydroxyphenyl)alkane-based dihydric phenols are preferred, and bisphenol A is more preferred. When bisphenol A is used as the dihydric phenol, the PC-POS copolymer is such that in the general formula (i), X represents an isopropylidene group and a=b=0.

Examples of the dihydric phenol except bisphenol A include bis(hydroxyaryl)alkanes, bis(hydroxyaryl)cycloalkanes, dihydroxyaryl ethers, dihydroxydiaryl sulfides, dihydroxydiaryl sulfoxides, dihydroxydiaryl sulfones, dihydroxydiphenyls, dihydroxydiaryl fluorenes, and dihydroxydiaryl adamantanes. Those dihydric phenols may be used alone or as a mixture thereof.

Examples of the bis(hydroxyaryl)alkanes include bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane.

Examples of the bis(hydroxyaryl)cycloalkanes include 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane. Examples of the dihydroxyaryl ethers include 4,4'-dihydroxydiphenyl ether and 4,4'-dihydroxy-3,3'-dimethylphenyl ether.

Examples of the dihydroxydiaryl sulfides include 4,4'-dihydroxydiphenyl sulfide and 4,4'-dihydroxy-3,3'-dimethyldiphenyl sulfide. Examples of the dihydroxydiaryl sulfoxides include 4,4'-dihydroxydiphenyl sulfoxide and 4,4'-dihydroxy-3,3'-dimethyldiphenyl sulfoxide. Examples of the dihydroxydiaryl sulfones include 4,4'-dihydroxydiphenyl sulfone and 4,4'-dihydroxy-3,3'-dimethyldiphenyl sulfone.

An example of the dihydroxydiphenyls is 4,4'-dihydroxydiphenyl. Examples of the dihydroxydiarylfluorenes include 9,9-bis(4-hydroxyphenyl)fluorene and 9,9-bis(4-hydroxy-3-methylphenyl)fluorene. Examples of the dihydroxydiaryladamantanes include 1,3-bis(4-hydroxyphenyl)adamantane, 2,2-bis(4-hydroxyphenyl)adamantane, and 1,3-bis(4-hydroxyphenyl)-5,7-dimethyladamantane.

Examples of dihydric phenols except those described above include 4,4'-[1,3-phenylenebis(1-methylethylidene)]bisphenol, 10,10-bis(4-hydroxyphenyl)-9-anthrone, and 1,5-bis(4-hydroxyphenylthio)-2,3-dioxapentane.

In order to adjust the molecular weight of the PC-POS copolymer (A) to be obtained, a terminal stopper (molecular weight modifier) may be used. Examples of the terminal stopper may include monohydric phenols, such as phenol, p-cresol, p-tert-butylphenol, p-tert-octylphenol, p-cumylphenol, p-nonylphenol, m-pentadecylphenol, and p-tert-amylphenol. Those monohydric phenols may be used alone or in combination thereof.

After the interfacial polycondensation reaction, the PC-POS copolymer (A) may be obtained by appropriately leaving the resultant at rest to separate the resultant into an aqueous phase and an organic solvent phase [separating step], washing the organic solvent phase (preferably washing the phase with a basic aqueous solution, an acidic aqueous solution, and water in the stated order) [washing step], concentrating the resultant organic phase [concentrating step], and drying the concentrated phase [drying step].

Aromatic Polycarbonate-Based Resin (B)

The aromatic polycarbonate-based resin (B) is a polycarbonate-based resin except the PC-POS copolymer (A), and preferably includes, in a main chain thereof, a repeating unit represented by the following general formula (III). The polycarbonate-based resin is not particularly limited, and various known polycarbonate-based resins may each be used.

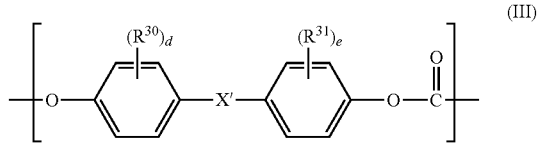

(III)

wherein $R^{30}$ and $R^{31}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and "d" and "e" each independently represent an integer of from 0 to 4.

Specific examples of the group represented by each of $R^{30}$ and $R^{31}$ include the same examples as those of $R^1$ and $R^2$, and preferred examples thereof are also the same as those of $R^1$ and $R^2$. $R^{30}$ and $R^{31}$ each more preferably represent an alkyl group having 1 to 6 carbon atoms or an alkoxy group having 1 to 6 carbon atoms. Specific examples of X' include the same examples as those of X, and preferred examples thereof are also the same as those of X. Symbols "d" and "e" each independently represent preferably from 0 to 2, more preferably 0 or 1.

Specifically, a resin obtained by a conventional production method for a polycarbonate may be used as the aromatic polycarbonate-based resin (B). Examples of the conventional method include: an interfacial polymerization method involving causing the dihydric phenol-based compound and phosgene to react with each other in the presence of an organic solvent inert to the reaction and an aqueous alkali solution, adding a polymerization catalyst, such as a tertiary amine or a quaternary ammonium salt, to the resultant, and polymerizing the mixture; and a pyridine method involving dissolving the dihydric phenol-based compound in pyridine or a mixed solution of pyridine and an inert solvent, and introducing phosgene to the solution to directly produce the resin.

A molecular weight modifier (terminal stopper), a branching agent, or the like is used as required in the reaction.

The dihydric phenol-based compound is, for example, a compound represented by the following general formula (III'):

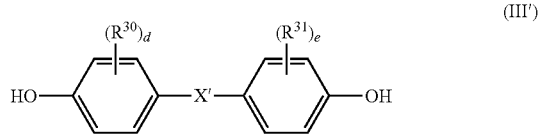

wherein $R^{30}$, $R^{31}$, X', "d", and "e" are as defined above, and preferred examples thereof are also the same as those described above.

Specific examples of the dihydric phenol-based compound may include those described above in the method of producing the polycarbonate-polyorganosiloxane copolymer (A), and preferred examples thereof are also the same as those described above. Among them, bis(hydroxyphenyl)alkane-based dihydric phenols are preferred, and bisphenol A is more preferred.

The aromatic polycarbonate-based resins (B) may be used alone or in combination thereof. The aromatic polycarbonate-based resin (B) may have a structure free of such a polyorganosiloxane block as represented by the formula (II) unlike the polycarbonate-polyorganosiloxane copolymer (A). For example, the aromatic polycarbonate-based resin (B) may be a homopolycarbonate resin.

Polyester-Based Resin (C)

The polyester-based resin (C) to be incorporated into the polycarbonate-based resin composition of the present invention may be, for example, a polymer or copolymer obtained by a condensation reaction involving using an aromatic dicarboxylic acid or a reactive derivative thereof and a diol or an ester derivative thereof as main components.

Examples of the aromatic dicarboxylic acid include terephthalic acid, isophthalic acid, o-phthalic acid, 1,5-naphthalenedicarboxylic acid, 2,6-naphthalenedicarboxylic acid, 4,4'-biphenyldicarboxylic acid, 4,4'-biphenyl ether dicarboxylic acid, 4,4'-biphenylmethane dicarboxylic acid, 4,4'-biphenyl sulfone dicarboxylic acid, 4,4'-biphenylisopropylidene dicarboxylic acid, 1,2-bis(phenoxy)ethane-4,4'-dicarboxylic acid, 2,5-anthracenedicarboxylic acid, 2,6-anthracenedicarboxylic acid, 4,4'-p-terphenylenedicarboxylic acid, and 2,5-pyridinedicarboxylic acid. Substituted products (e.g., alkyl group-substituted products, such as 5-methylisophthalic acid) and reactive derivatives (e.g., alkyl ester derivatives, such as dimethyl terephthalate and diethyl terephthalate) thereof may also be used.

Among them, terephthalic acid, 2,6-naphthalenedicarboxylic acid, and alkyl ester derivatives thereof are more preferred, and terephthalic acid and alkyl ester derivatives thereof are particularly preferred. Those aromatic dicarboxylic acids may be used alone or in combination thereof. One or more of, for example, aliphatic dicarboxylic acids, such as adipic acid, azelaic acid, sebacic acid, and dodecanedioic acid, and alicyclic dicarboxylic acids, such as cyclohexane dicarboxylic acid, may also be used in combination with the aromatic dicarboxylic acid.

Examples of the diols each serving as a component of the polyester-based resin (C) may include: aliphatic diols, such as ethylene glycol, diethylene glycol, 1,2-propylene glycol, 1,3-propanediol, triethylene glycol, 1,4-butanediol, neopentyl glycol, 1,5-pentanediol, 1,6-hexanediol, decamethylene glycol, and 2,2-dimethyl-1,3-propanediol; alicyclic diols, such as 1,4-cyclohexanedimethanol, 1,3-cyclohexanedimethanol, cyclohexanediol, and trans- or cis-2,2,4,4-tetramethyl-1,3-cyclobutanediol; and aromatic diols, such as p-xylenediol, bisphenol A, tetrabromobisphenol A, and tetrabromobisphenol A-bis(2-hydroxyethyl ether). Substituted products thereof may also be used.

Among them, in terms of heat resistance, dimensional stability, and the like, an aliphatic diol and an alicyclic diol are preferred, an aliphatic diol is more preferred, ethylene glycol, 1,4-butanediol, or 1,4-cyclohexanedimethanol is more preferred, and 1,4-butanediol is particularly preferred. The diols may be used alone or in combination thereof. In addition, one or more of long-chain diols each having a molecular weight of from 400 or more to 6,000 or less, that is, for example, a polyethylene glycol, a poly-1,3-propylene glycol, and a polytetramethylene glycol may be used as diol components in combination with the above-mentioned diols and copolymerized therewith.

The polyester-based resin (C) may be copolymerized with a hydroxycarboxylic acid, such as parahydroxybenzoic acid, any other carboxylic acid, or an alcohol except the above-mentioned diols, and such copolymerized resin may also be used in the present invention. However, the amount of such copolymerized component is preferably as small as possible, and components derived from the aromatic dicarboxylic acid and the aliphatic diol account for preferably 80 mass % or more, more preferably 90 mass % or more of the polyester-based resin (C). In addition, one kind of compound accounts for preferably 80 mol % or more, more preferably 90 mol % or more of each of the aromatic dicarboxylic acid and the aliphatic diol.

The polyester-based resin (C) may be branched by introducing a small amount of a branching agent. Although the kind of the branching agent is not limited, examples thereof include trimesic acid, trimellitic acid, trimethylolethane, trimethylolpropane, and pentaerythritol.

Specific examples of the polyester-based resin (C) include: a polyethylene terephthalate (PET), a polypropylene terephthalate, a polybutylene terephthalate (PBT), a polyhexylene terephthalate, a polyethylene naphthalate (PEN), a polybutylene naphthalate (PBN), and a polyethylene-1,2-bis(phenoxy)ethane-4,4'-dicarboxylate; and copolymerized polyester-based resins, such as a polyethylene isophthalate/terephthalate and a polybutylene terephthalate/isophthalate. Among them, a polyethylene terephthalate, a polybutylene terephthalate, a polyethylene naphthalate, a polybutylene naphthalate, and mixtures thereof having balanced mechanical properties and the like may be preferably used. The polyester-based resin (C) is more preferably at least one selected from a polyethylene terephthalate and a polybutylene terephthalate from the viewpoint of the ease of availability of a material therefor, and is still more preferably a polybutylene terephthalate from the viewpoint of impact resistance. The compounds preferably have a ratio "PET: PBT" of from 1:1 to 1:8 (mass ratio) when used in combination.

In the present invention, the polyester-based resin (C) more preferably satisfies the following requirement. The polyester-based resin may contain a residual metal resulting from impurities at the time of its production. It is preferred that the amount of titanium in the polyester-based resin (C) be 120 ppm by mass or less, and/or the amount of tin therein be 50 ppm by mass or less. When the amount of titanium in the polyester-based resin (C) and/or the amount of tin therein satisfies the range, a resin composition having more excellent impact resistance can be obtained. The titanium amount and the tin amount refer to values measured by ICP emission spectrometry. Detailed analysis conditions are described later in Examples.

The amount of titanium in the polyester-based resin (C) is more preferably 100 ppm by mass or less, still more preferably 80 ppm by mass or less, still further more preferably 70 ppm by mass or less. The amount of tin in the polyester-based resin (C) is more preferably 30 ppm by mass or less, still more preferably 20 ppm by mass or less, still further more preferably 10 ppm by mass or less.

Amide Compound (D)

A compound having an amide bond (—CO—N—) in a molecule thereof may be used as the amide compound (D) in the polycarbonate-based resin composition of the present invention. A compound represented by the following general formula (IV) may be given as a preferred example of the amide compound (D):

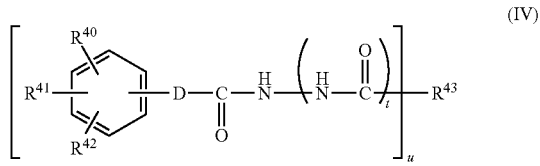

wherein, in the formula (IV), $R^{40}$, $R^{41}$, and $R^{42}$ each independently represent a hydrogen atom, a hydroxyl group, a linear or branched alkyl group having 1 to 8 carbon atoms, an alkoxy group having 1 to 8 carbon atoms, or an aryl group having 6 to 18 carbon atoms, or $R^{40}$, $R^{41}$, and $R^{42}$ are bonded to each other to represent a cyclic structure (the number of carbon atoms of the cyclic structure is from 10 to 18 in terms of total number of carbon atoms of a fused ring), D represents a single bond or an alkylene group having 1 to 20 carbon atoms, $R^{43}$ represents a single bond, or a substituted or unsubstituted hydrocarbon group or heterocyclic group having 1 to 30 carbon atoms, and when $R^{43}$ represents a single bond, the single bond may be bonded to an aromatic ring to which D is bonded to form a ring, "t" represents 0 or 1, and "u" represents from 1 to 3, and when "u" represents 2 or more, the compound has a symmetric or asymmetric structure with respect to $R^{43}$.

Among the amide compounds (D) each represented by the general formula (IV), compounds represented by the following general formulae (V) to (VII) are more preferred:

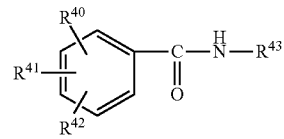

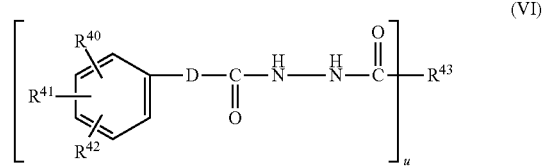

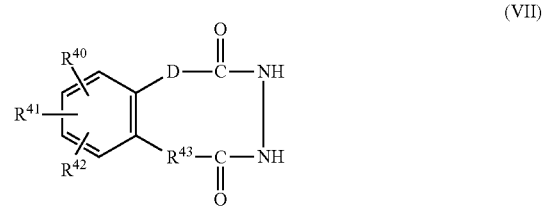

wherein $R^{40}$, $R^{41}$, $R^{42}$, $R^{43}$, D, and "u" are as described above.

For example, the amide compound (D) may be such an amide compound as represented by the general formula (V), or may be such a hydrazide compound as represented by any one of the general formulae (VI) and (VII). Among them, a hydrazide compound represented by the general formula (VI) is preferred.

Specific examples of the amide compound (D) may include 1,10-decanedicarboxylic acid di(N'-salicyloylhydrazide), 3-(N-salicyloyl)amino-1H-1,2,4-triazole, 1,2-bis(3-(3,5-di-tert-butyl-4-hydroxyphenyl)propionyl)hydrazine, and phthalic hydrazide. The polycarbonate-based resin composition preferably includes at least one kind among those compounds.

Other Components

Any other additive may be incorporated into the polycarbonate-based resin composition of the present invention to the extent that the effects of the present invention are not impaired. Examples of the other additive may include an antioxidant, an alicyclic epoxy compound, a UV absorber, a release agent, a reinforcing material, a filler, an elastomer for an impact resistance improvement, a dye, a pigment, an antistatic agent, and other resins except the polycarbonate.

Polycarbonate-Based Resin Composition

The polycarbonate-based resin composition of the present invention includes: 50 mass % or more to 99 mass % or less of the polycarbonate-based resin (S) containing 0.1 mass % or more to 100 mass % or less of the polycarbonate-polyorganosiloxane copolymer (A), and 0 mass % or more to 99.9 mass % or less of the aromatic polycarbonate-based resin (B) except the polycarbonate-polyorganosiloxane copolymer (A); and 1 mass % or more to 50 mass % or less of the polyester-based resin (C). The total amount of the polycarbonate-based resin (S) and the polyester-based resin (C) is set to 100 mass %. In addition, the composition needs to include 0.001 part by mass or more to 1 part by mass or less of the amide compound (D) with respect to 100 parts by mass of the total amount of the polycarbonate-based resin (S) and the polyester-based resin (C).

In the polycarbonate-based resin composition of the present invention, the content of the polycarbonate-polyorganosiloxane copolymer (A) in the polycarbonate-based resin (S) needs to be from 0.1 mass % or more to 100 mass % or less from the viewpoint of impact resistance, and is typically 5 mass % or more, preferably 10 mass % or more, more preferably 20 mass % or more, still more preferably 30 mass % or more, and is preferably 99 mass % or less, more preferably 95 mass % or less.

The content of the aromatic polycarbonate-based resin (B) in the polycarbonate-based resin (S) needs to be from 0 mass % or more to 99.9 mass % or less from the viewpoint of the impact resistance of the resin composition to be obtained, and is preferably 1 mass % or more, and is typically 95 mass % or less, preferably 90 mass % or less, more preferably 80 mass % or less, still more preferably 70 mass % or less.

The content of the polyorganosiloxane block (A-2) in the polycarbonate-based resin (S) is preferably from 0.1 mass % or more to 10 mass % or less. When the content of the polyorganosiloxane block (A-2) in the polycarbonate-based resin (S) falls within the range, a more excellent impact-resisting characteristic can be obtained.

The content of the polyorganosiloxane block (A-2) in the polycarbonate-based resin (S) is more preferably 0.4 mass % or more, still more preferably 0.8 mass % or more, still further more preferably 0.9 mass % or more, particularly preferably 2 mass % or more, and is more preferably 8 mass % or less, still more preferably 7 mass % or less, particularly preferably 6 mass % or less.

The content of the polyorganosiloxane block (A-2) in the polycarbonate-based resin composition is preferably from 0.1 mass % or more to 10 mass % or less. When the content of the polyorganosiloxane block (A-2) in the entirety of the polycarbonate-based resin composition falls within the range, a more excellent impact-resisting characteristic can be obtained.

The content of the polyorganosiloxane block (A-2) in the polycarbonate-based resin composition is more preferably 0.4 mass % or more, still more preferably 0.8 mass % or more, still further more preferably 0.9 mass % or more, particularly preferably 2 mass % or more, and is more preferably 8 mass % or less, still more preferably 7 mass % or less, particularly preferably 6 mass % or less.

The polycarbonate-based resin composition of the present invention contains 1 mass % or more to 50 mass % or less of the polyester-based resin (C) in 100 mass % of the total of the polycarbonate-based resin (S) and the polyester-based resin (C). When the content of the polyester-based resin (C) falls within the range, a molded article to be obtained can have extremely excellent impact resistance. The content of the polyester-based resin (C) in the polycarbonate-based resin composition is preferably 3 mass % or more, more preferably 5 mass % or more, still more preferably 10 mass % or more, particularly preferably 15 mass % or more, most preferably 20 mass % or more, and is preferably 45 mass % or less, more preferably 35 mass % or less, still more preferably 30 mass % or less, particularly preferably 25 mass % or less.

The content of the amide compound (D) in the polycarbonate-based resin composition of the present invention is from 0.001 part by mass or more to 1 part by mass or less with respect to 100 parts by mass of the total amount of the polycarbonate-based resin (S) and the polyester-based resin (C). When the content of the amide compound (D) falls within the range, the molded article to be obtained can have extremely excellent impact resistance. The content of the amide compound (D) with respect to 100 parts by mass of the total amount of the polycarbonate-based resin (S) and the polyester-based resin (C) is preferably 0.005 part by mass or more, more preferably 0.01 part by mass or more, still more preferably 0.03 part by mass or more, and is preferably 0.8 part by mass or less, more preferably 0.5 part by mass or less, still more preferably 0.3 part by mass or less, particularly preferably 0.15 part by mass or less.

The viscosity-average molecular weight (Mv) of the polycarbonate-based resin (S) containing the PC-POS copolymer (A) and the aromatic polycarbonate-based resin (B) may be appropriately adjusted by using, for example, a molecular weight modifier (terminal stopper) so as to be a target molecular weight in accordance with applications or products in which the resin (S) is used. The viscosity-average molecular weight of the polycarbonate-based resin (S) is preferably from 9,000 or more to 50,000 or less. When the viscosity-average molecular weight is 9,000 or more, a molded article having higher strength can be obtained. When the viscosity-average molecular weight is 50,000 or less, injection molding or extrusion molding can be more easily performed at the temperature at which the heat deterioration of the resin (S) does not occur.

The viscosity-average molecular weight of the polycarbonate-based resin (S) is more preferably 12,000 or more, still more preferably 14,000 or more, particularly preferably 16,000 or more, and is more preferably 30,000 or less, still more preferably 23,000 or less, particularly preferably 21,000 or less.

The viscosity-average molecular weight (Mv) is a value calculated from the following Schnell's equation by measuring the limiting viscosity [η] of a methylene chloride solution at 20° C.

$$[\eta]=1.23\times10^{-5}\times M_v^{0.83}$$

The polycarbonate-based resin composition of the present invention is obtained by: blending the above-mentioned respective components at the above-mentioned ratios and various optional components to be used as required at appropriate ratios; and kneading the components.

In one aspect of the present invention, the total content of the component (A), the component (B), the component (C), and the component (D) is preferably from 80 mass % to 100 mass %, more preferably from 95 mass % to 100 mass %, still more preferably from 97 mass % to 100 mass %, particularly preferably from 98 mass % to 100 mass %, most preferably from 99 mass % to 100 mass % with respect to the total amount (100 mass %) of the polycarbonate-based resin composition.

In another aspect of the present invention, the total content of the component (A), the component (B), the component (C), the component (D), and the other components is preferably from 90 mass % to 100 mass %, more preferably from 95 mass % to 100 mass %, still more preferably from 97 mass % to 100 mass %, particularly preferably from 98 mass % to 100 mass %, most preferably from 99 mass % to 100 mass % with respect to the total amount (100 mass %) of the polycarbonate-based resin composition.

The blending and the kneading may be performed by a method involving premixing with a typically used apparatus, such as a ribbon blender or a drum tumbler, and using, for example, a Henschel mixer, a Banbury mixer, a single-screw extruder, a twin-screw extruder, a multi-screw extruder, or a Ko-kneader. In normal cases, a heating temperature at the time of the kneading is appropriately selected from the range of from 240° C. or more to 320° C. or less. An extruder, in particular a vented extruder is preferably used in the melt-kneading.

The polycarbonate-based resin composition of the present invention is characterized by having extremely excellent impact resistance. Specifically, the composition can have the following high Izod impact strength: the notched Izod impact strength of the composition at 23° C., which is measured in conformity with ASTM Standard D-256, is 70 kJ/m² or more. The notched Izod impact strength of the polycarbonate-based resin composition of the present invention at 23° C., which is measured in conformity with ASTM Standard D-256, is more preferably 90 kJ/m² or more, still more preferably 100 kJ/m² or more, still further more preferably 110 kJ/m² or more.

Molded Article

Various molded articles may each be produced by an injection molding method, an injection compression molding method, an extrusion molding method, a blow molding method, a press molding method, a vacuum molding method, an expansion molding method, or the like using as a raw material the melt-kneaded polycarbonate-based resin composition of the present invention or a pellet obtained through the melt-kneading. In particular, the pellet obtained through the melt-kneading can be suitably used in the production of injection-molded articles by injection molding and injection compression molding.

The molded article formed of the polycarbonate-based resin composition of the present invention has extremely excellent impact resistance. The notched Izod impact strength of the molded article at 23° C., which is measured in conformity with ASTM Standard D-256, is preferably 70 kJ/m² or more, more preferably 90 kJ/m² or more, still more preferably 100 kJ/m² or more, still further more preferably 110 kJ/m² or more.

The molded article formed of the polycarbonate-based resin composition of the present invention can be suitably used in, for example, exterior and internal parts for parts for electrical and electronic equipment, such as a television, a radio, a camera, a video camera, an audio player, a DVD player, an air conditioner, a cellular phone, a smartphone, a transceiver, a display, a computer, a tablet terminal, portable game equipment, stationary game equipment, wearable electronic equipment, a register, an electronic calculator, a copying machine, a printer, a facsimile, a communication base station, a battery, or a robot, exterior and internal parts for an automobile, a railway vehicle, a ship, an aircraft, equipment for space industry, or medical equipment, and a part for a building material.

EXAMPLES

The present invention is more specifically described by way of Examples. However, the present invention is by no means limited by these Examples. In each of Examples, characteristic values and evaluation results were determined in the following manner.

(1) Chain Length and Content of Polydimethylsiloxane

The chain length and content of a polydimethylsiloxane were calculated by NMR measurement from the integrated value ratio of a methyl group of the polydimethylsiloxane. In this description, the polydimethylsiloxane is sometimes abbreviated as PDMS.

Quantification Method for Chain Length of Polydimethylsiloxane $^1$H-NMR Measurement Conditions NMR apparatus: ECA-500 manufactured by JEOL Resonance Co., Ltd.
Probe: 50TH5AT/FG2
Observed range: −5 ppm to 15 ppm
Observation center: 5 ppm
Pulse repetition time: 9 sec
Pulse width: 45°
NMR sample tube: 5 φ
Sample amount: 30 mg to 40 mg
Solvent: deuterochloroform
Measurement temperature: room temperature
Number of scans: 256 times Allylphenol-Terminated Polydimethylsiloxane A: an integrated value of a methyl group in a dimethylsiloxane moiety observed around δ-0.02 to δ 0.5
B: an integrated value of a methylene group in allylphenol observed around δ 2.50 to δ 2.75
Chain length of polydimethylsiloxane=(A/6)/(B/4)

Eugenol-Terminated Polydimethylsiloxane

A: an integrated value of a methyl group in a dimethylsiloxane moiety observed around δ-0.02 to δ 0.5
B: an integrated value of a methylene group in eugenol observed around δ 2.40 to δ 2.70
Chain length of polydimethylsiloxane=(A/6)/(B/4)

Quantification Method for Content of Polydimethylsiloxane

Quantification method for the copolymerization amount of a polydimethylsiloxane in a PTBP-terminated polycarbonate obtained by copolymerizing an allylphenol-terminated polydimethylsiloxane.

NMR apparatus: ECA-500 manufactured by JEOL Resonance Co., Ltd.
Probe: 50TH5AT/FG2
Observed range: −5 ppm to 15 ppm
Observation center: 5 ppm
Pulse repetition time: 9 sec
Pulse width: 45°
Number of scans: 256 times
NMR sample tube: 5 φ
Sample amount: 30 mg to 40 mg
Solvent: deuterochloroform
Measurement temperature: room temperature
A: an integrated value of a methyl group in a BPA moiety observed around δ 1.5 to δ 1.9
B: an integrated value of a methyl group in a dimethylsiloxane moiety observed around δ −0.02 to δ 0.3
C: an integrated value of a butyl group in a p-tert-butylphenyl moiety observed around δ 1.2 to δ 1.4
a=A/6
b=B/6
c=C/9
T=a+b+c f=a/T×100
g=b/T×100
h=c/T×100
TW=f×254+g×74.1+h×149
PDMS (wt %)=g×74.1/TW×100

(2) Viscosity-Average Molecular Weight

A viscosity-average molecular weight (Mv) was calculated from the following equation (Schnell's equation) by using a limiting viscosity [η] determined through the measurement of the viscosity of a methylene chloride solution at 20° C. with an Ubbelohde-type viscometer.

$$[\eta]=1.23\times10^{-5}\times Mv^{0.83}$$

(3) Methods of Measuring Titanium Amount and Tin Amount in Polyester-Based Resin (C)

A titanium amount and a tin amount were determined by ICP emission spectrometry. Specifically, analysis was performed as described below.

2.5 g of each polyester-based resin (C) was collected in a platinum dish, and 2.5 ml of sulfuric acid was added thereto. Next, the mixture was heated with a hot plate while its temperature was gradually increased from room temperature to 400° C. Thus, the polyester-based resin was carbonized. Further, the carbonized product was ashed with an electric furnace at 550° C. for 12 hours, and was then left standing to cool, followed by the addition of 0.1 g of a flux (lithium tetraborate:lithium fluoride=9:1 (mass ratio)) to the platinum dish. The temperature of the electric furnace was increased to 930° C., and the resultant was subjected to an alkali fusion treatment at the temperature for 30 minutes. The platinum dish was removed from the electric furnace, and was left standing to cool to room temperature. After that, 15 ml of a tartaric acid-sulfuric acid solution (composition: 0.5 mass % tartaric acid+2 mass % nitric acid solution) was added to the resultant, and the mixture was subjected to a heating and dissolving treatment with a hot plate at 120° C. for from 30 minutes to 60 minutes.

Next, the solution in the platinum dish was diluted with pure water (diluted with 125 ml of pure water in the case of titanium or with 25 ml of pure water in the case of tin). The resultant diluted liquid was subjected to measurement with an ICP emission spectrometer (manufactured by Agilent Technology, Agilent 5100 ICP-OES, software: ICP Expert), and its metal amount was determined by a calibration-curve method.

Production of Polycarbonate Oligomer

Sodium dithionite was added in an amount of 2,000 ppm with respect to bisphenol A (BPA) (to be dissolved later) to 5.6 mass % aqueous sodium hydroxide, and then BPA was dissolved in the mixture so that the concentration of BPA was 13.5 mass %. Thus, a solution of BPA in aqueous sodium hydroxide was prepared.

The solution of BPA in aqueous sodium hydroxide, methylene chloride, and phosgene were continuously passed through a tubular reactor having an inner diameter of 6 mm and a tube length of 30 m at flow rates of 40 L/hr, 15 L/hr, and 4.0 kg/hr, respectively. The tubular reactor had a jacket portion and the temperature of the reaction liquid was kept at 40° C. or less by passing cooling water through the jacket. The reaction liquid that had exited the tubular reactor was continuously introduced into a baffled vessel-type reactor provided with a sweptback blade and having an internal volume of 40 L. The solution of BPA in aqueous sodium hydroxide, 25 mass % aqueous sodium hydroxide, water, and a 1 mass % aqueous solution of triethylamine were further added to the reactor at flow rates of 2.8 L/hr, 0.07 L/hr, 17 L/hr, and 0.64 L/hr, respectively, to perform a reaction. An aqueous phase was separated and removed by continuously taking out the reaction liquid overflowing the vessel-type reactor and leaving the reaction liquid at rest. Then, a methylene chloride phase was collected.

The polycarbonate oligomer thus obtained had a concentration of 341 g/L and a chloroformate group concentration of 0.71 mol/L.

Production Examples 1 to 5 of Polycarbonate-Polyorganosiloxane Copolymer (A)

Values in the parentheses (i) to (xiv) described below represent the usage amounts of the respective components, and are as shown in Table 1.

(i) L of the polycarbonate oligomer solution (PCO) produced as described above, (ii) L of methylene chloride (MC), and a solution prepared by dissolving (iv) g of an allylphenol terminal-modified polydimethylsiloxane having an average chain length "n" of (iii) (hereinafter, the polydimethylsiloxane is sometimes referred to as "PDMS") in (v) L of methylene chloride (MC), and (vi) mL of triethylamine (TEA) were loaded into a 50-liter vessel-type reactor including a baffle board, a paddle-type stirring blade, and a cooling jacket. (vii) g of 8.0 mass % aqueous sodium hydroxide (NaOHaq) was added to the mixture under stirring to perform a reaction between the polycarbonate oligomer and the allylphenol terminal-modified PDMS for 20 minutes (preliminary polymerization step).

A solution of p-t-butylphenol (PTBP) in methylene chloride (prepared by dissolving (viii) g of PTBP in (ix) L of methylene chloride (MC)) and a solution of BPA in aqueous sodium hydroxide (prepared by dissolving (xiii) g of BPA in an aqueous solution prepared by dissolving (x) g of NaOH and (xi) g of sodium dithionite ($Na_2S_2O_4$) in (xii) L of water) were added to the polymerization liquid to perform a polymerization reaction for 40 minutes (main polymerization step).

(xiv) L of methylene chloride (MC) was added to the resultant for dilution, and the mixture was stirred for 10 minutes. After that, the mixture was separated into an organic phase containing a PC-POS, and an aqueous phase containing excess amounts of BPA and NaOH, and the organic phase was isolated.

The solution of the PC-POS in methylene chloride thus obtained was sequentially washed with 0.03 mol/L aqueous NaOH and 0.2 mol/L hydrochloric acid in amounts of 15 vol % each with respect to the solution. Next, the solution was repeatedly washed with pure water until an electric conductivity in an aqueous phase after the washing became 0.010/m or less.

The solution of the polycarbonate in methylene chloride obtained by the washing was concentrated and pulverized, and the resultant flake was dried under reduced pressure at 100° C. The results of the measurement of the PDMS concentration and viscosity-average molecular weight of the resultant flake are shown in Table 1.

TABLE 1

| | Production Example | | | | |
|---|---|---|---|---|---|
| | 1 | 2 | 3 | 4 | 5 |
| PC-POS (A) | A1 | A2 | A3 | A4 | A5 |
| (i) PCO (L) | 15.0 | 15.0 | 11.0 | 11.0 | 12.0 |
| (ii) MC (L) | 10.1 | 10.1 | 24.5 | 24.5 | 27.6 |
| (iii) PDMS chain length (n) | 37 | 91 | 61 | 91 | 279 |
| (iv) PDMS loading amount (g) | 407 | 390 | 1,800 | 1,400 | 305 |
| (v) MC (L) | 0.5 | 0.5 | 2.0 | 2.0 | 1.0 |
| (vi) TEA (mL) | 9.2 | 9.2 | 6.2 | 6.2 | 6.7 |
| (vii) NaOHaq (g) | 1,065 | 1,065 | 1,405 | 1,405 | 852 |
| (viii) PTBP (g) | 70.4 | 70.4 | 51.6 | 51.6 | 56.3 |
| (ix) MC (L) | 1.0 | 1.0 | 0.5 | 0.5 | 0.3 |
| (x) NaOH (g) | 618 | 618 | 412 | 412 | 443 |
| (xi) $Na_2S_2O_4$ (g) | 2.1 | 2.1 | 1.5 | 1.5 | 1.7 |
| (xii) Water (L) | 9.0 | 9.0 | 6.0 | 6.0 | 6.5 |
| (xiii) BPA (g) | 1,093 | 1,093 | 766 | 766 | 835 |
| (xiv) MC (L) | 13 | 13 | 0 | 0 | 0 |
| Mv | 17,700 | 17,700 | 17,600 | 17,700 | 17,800 |
| PDMS concentration (wt %) | 6 | 6 | 30 | 25 | 6 |

Aromatic Polycarbonate-Based Resin (B)

Aromatic homopolycarbonate resin (B1) [manufactured by Idemitsu Kosan Co., Ltd., TARFLON FN2500 (product name), viscosity-average molecular weight=23,500]

Aromatic homopolycarbonate resin (B2) [manufactured by Idemitsu Kosan Co., Ltd., TARFLON FN1700 (product name), viscosity-average molecular weight=17,700]

Polyester-Based Resin (C)

Polybutylene terephthalate (C1): [DURANEX 2002EF2001: manufactured by WinTech Polymer Ltd., Ti=66 ppm by mass, Sn<1 ppm by mass]

Polybutylene terephthalate (C2): [NOVADURAN 5010R3-2: manufactured by Mitsubishi Engineering-Plastics Corporation, Ti=44 ppm by mass, Sn<1 ppm by mass]

Amide Compound (D)

1,10-Decanedicarboxylic acid di(N'-salicyloyl hydrazide) (D1): [ADK STAB CDA-6, manufactured by ADEKA Corporation]

3-(N-Salicyloyl)amino-1H-1,2,4-triazole (D2): [ADK STAB CDA-1, manufactured by ADEKA Corporation]

Phthalic acid hydrazide (D3): [manufactured by Tokyo Chemical Industry, Co., Ltd.]

Other Components

Antioxidant: IRGAFOS 168 [tris(2,4-di-t-butylphenyl) phosphite, manufactured by BASF Japan Ltd.]

Antioxidant: IRGANOX 1076 [octadecyl 3-(3,5-di-t-butyl-4-hydroxyphenyl)propionate, manufactured by BASF Japan Ltd.]

Examples 1 to 18 and Comparative Examples 1 to 4

The PC-POS copolymer, the aromatic PC resin, the polyester-based resin, the amide compound, and the other respective components were mixed at blending ratios shown in each of Tables 2 to 4. The mixture was supplied to a vented twin-screw extruder (manufactured by Toshiba Machine Co., Ltd., TEM-35B), and was melt-kneaded at a screw revolution number of 150 rpm, an ejection amount of 20 kg/hr, and a resin temperature of from 295° C. to 310° C. to provide an evaluation pellet sample. Physical property tests to be described later were performed by using the resultant pellet. The results are also shown in Tables 2 to 4.

TABLE 2

| | | | | Example | | | | Comparative Example | Example | Comparative Example | Example |
|---|---|---|---|---|---|---|---|---|---|---|---|
| | | | | 1 | 2 | 3 | 4 | 1 | 5 | 2 | 6 |
| PC-based resin (S) | (A) PC-POS | (A1) | Part(s) by mass | 75 | 75 | 75 | 75 | 75 | 75 | 75 | 60 |
| | | (A2) | Part(s) by mass | | | | | | | | |
| | | (A3) | Part(s) by mass | | | | | | | | |
| | | (A4) | Part(s) by mass | | | | | | | | |
| | | (A5) | Part(s) by mass | | | | | | | | |
| | (B) GP-PC | (B1) FN2500 | Part(s) by mass | | | | | | | | 15 |
| | | (B2) FN1700 | Part(s) by mass | | | | | | | | |

TABLE 2-continued

|  |  |  | Example 1 | Example 2 | Example 3 | Example 4 | Comparative Example 1 | Example 5 | Comparative Example 2 | Example 6 |
|---|---|---|---|---|---|---|---|---|---|---|
| (C) PE-based resin | (C1) DURANEX 2002 | Part(s) by mass | 25 | 25 | 25 | 25 | 25 | — | — | 25 |
|  | (C2) NOVADURAN 5010R3-2 | Part(s) by mass | — | — | — | — | — | 25 | 25 | — |
| (D) Amide compound | (D1) CDA-6 | Part(s) by mass | 0.03 | 0.06 | 0.1 | 0.3 | — | 0.06 | — | — |
|  | (D2) CDA-1 | Part(s) by mass | — | — | — | — | — | — | — | 0.1 |
|  | (D3) Phthalic hydrazide | Part(s) by mass | — | — | — | — | — | — | — | — |
| Others | Irgafos 168 | Part(s) by mass | 0.10 | 0.10 | 0.10 | 0.10 | 0.10 | 0.10 | 0.10 | 0.10 |
|  | Irganox 1076 | Part(s) by mass | 0.10 | 0.10 | 0.10 | 0.10 | 0.10 | 0.10 | 0.10 | 0.10 |
| Molecular weight Mv of polycarbonate-based resin (S) |  |  | 17,700 | 17,700 | 17,700 | 17,700 | 17,700 | 17,700 | 17,700 | 18,900 |
| PDMS block moiety content in polycarbonate-based resin (S) |  | mass % | 6.0 | 6.0 | 6.0 | 6.0 | 6.0 | 6.0 | 6.0 | 4.8 |
| Physical property | MVR (300° C., 1.2 kg) | ml/10 min | 36 | 44 | 47 | 67 | 31 | 38 | 59 | 51 |
|  | Q value (280° C., 160 kg) | ×0.01 ml/s | 24 | 29 | 30 | 45 | 22 | 25 | 28 | 28 |
|  | Izod impact strength (23° C.) | kJ/m$^2$ | 74 | 136 | 137 | 104 | 10 | 115 | 10 | 108 |
|  | Izod impact strength (0° C.) | kJ/m$^2$ | 35 | 130 | 131 | 100 | 11 | 117 | — | 83 |
|  | Izod impact strength (−10° C.) | kJ/m$^2$ | — | 129 | 129 | 67 | 11 | 117 | 10 | 16 |
|  | Izod impact strength (−20° C.) | kJ/m$^2$ | — | 115 | — | — | — | 87 | — | — |
|  | Izod impact strength (−30° C.) | kJ/m$^2$ | — | 101 | 41 | — | — | — | 10 | — |

TABLE 3

|  |  |  |  | Example 7 | Example 8 | Example 9 | Comparative Example 3 | Example 10 |
|---|---|---|---|---|---|---|---|---|
| PC-based resin (S) | (A) PC-POS | (A1) | Part(s) by mass |  |  |  |  |  |
|  |  | (A2) | Part(s) by mass | 75 | 75 | 75 | 75 | 68 |
|  |  | (A3) | Part(s) by mass |  |  |  |  |  |
|  |  | (A4) | Part(s) by mass |  |  |  |  |  |
|  |  | (A5) | Part(s) by mass |  |  |  |  |  |
|  | (B) GP-PC | (B1) FN2500 | Part(s) by mass |  |  |  |  | 17 |
|  |  | (B2) FN1700 | Part(s) by mass |  |  |  |  |  |
| (C) PE-based resin |  | (C1) DURANEX 2002 | Part(s) by mass | 25 | 25 | 25 | 25 | 15 |
|  |  | (C2) NOVADURAN 5010R3-2 | Part(s) by mass |  |  |  |  |  |
| (D) Amide compound |  | (D1) CDA-6 | Part(s) by mass | 0.1 | — | — | — | 0.1 |
|  |  | (D2) CDA-1 | Part(s) by mass | — | 0.06 | — | — | — |

TABLE 3-continued

|  |  |  |  |  |  |  |  |
|---|---|---|---|---|---|---|---|
|  | (D3) Phthalic hydrazide | Part(s) by mass | — | — | 0.04 | — | — |
| Others | Irgafos 168 | Part(s) by mass | 0.10 | 0.10 | 0.10 | 0.10 | 0.10 |
|  | Irganox 1076 | Part(s) by mass | 0.10 | 0.10 | 0.10 | 0.10 | 0.10 |
| Molecular weight Mv of polycarbonate-based resin (S) |  |  | 17,700 | 17,700 | 17,700 | 17,700 | 18,900 |
| PDMS block moiety content in polycarbonate-based resin (S) |  | mass % | 6.0 | 6.0 | 6.0 | 6.0 | 4.8 |
| Physical property | MVR (300° C., 1.2 kg) | ml/10 min | 45 | 45 | 43 | 34 | 36 |
|  | Q value (280° C., 160 kg) | ×0.01 ml/s | 31 | 30 | 24 | 24 | 22 |
|  | Izod impact strength (23° C.) | kJ/m² | 131 | 114 | 127 | 86 | 128 |
|  | Izod impact strength (0° C.) | kJ/m² | 125 | 107 | 123 | 74 | 109 |
|  | Izod impact strength (−10° C.) | kJ/m² | 122 | 91 | 115 | 67 | 102 |
|  | Izod impact strength (−20° C.) | kJ/m² | 104 | — | — | 25 | 88 |
|  | Izod impact strength (−30° C.) | kJ/m² | — | — | — | 20 | — |

|  |  |  |  | Example |  |  |  |
|---|---|---|---|---|---|---|---|
|  |  |  |  | 11 | 12 | 13 | 14 |
| PC-based resin (S) | (A) PC-POS | (A1) | Part(s) by mass |  |  |  |  |
|  |  | (A2) | Part(s) by mass | 60 | 60 | 60 | 52 |
|  |  | (A3) | Part(s) by mass |  |  |  |  |
|  |  | (A4) | Part(s) by mass |  |  |  |  |
|  |  | (A5) | Part(s) by mass |  |  |  |  |
|  | (B) GP-PC | (B1) FN2500 | Part(s) by mass | 15 | 15 | 15 | 13 |
|  |  | (B2) FN1700 | Part(s) by mass |  |  |  |  |
| (C) PE-based resin |  | (C1) DURANEX 2002 | Part(s) by mass | 25 | 25 | 25 | 35 |
|  |  | (C2) NOVADURAN 5010R3-2 | Part(s) by mass |  |  |  |  |
| (D) Amide compound |  | (D1) CDA-6 | Part(s) by mass | 0.06 | 0.1 | — | 0.1 |
|  |  | (D2) CDA-1 | Part(s) by mass | — | — | 0.1 | — |
|  |  | (D3) Phthalic hydrazide | Part(s) by mass | — | — | — | — |
| Others |  | Irgafos 168 | Part(s) by mass | 0.10 | 0.10 | 0.10 | 0.10 |
|  |  | Irganox 1076 | Part(s) by mass | 0.10 | 0.10 | 0.10 | 0.10 |
| Molecular weight Mv of polycarbonate-based resin (S) |  |  |  | 18,900 | 18,900 | 18,900 | 18,900 |
| PDMS block moiety content in polycarbonate-based resin (S) |  |  | mass % | 4.8 | 4.8 | 4.8 | 4.8 |
| Physical property |  | MVR (300° C., 1.2 kg) | ml/10 min | 42 | 46 | 53 | 56 |
|  |  | Q value (280° C., 160 kg) | ×0.01 ml/s | 24 | 28 | 30 | 33 |
|  |  | Izod impact strength (23° C.) | kJ/m² | 117 | 139 | 129 | 131 |

TABLE 3-continued

|  |  |  |  |  |  |  |
|---|---|---|---|---|---|---|
| Izod impact strength (0° C.) | kJ/m² | 108 | 129 | 113 | 123 |
| Izod impact strength (−10° C.) | kJ/m² | 89 | 117 | — | — |
| Izod impact strength (−20° C.) | kJ/m² | — | — | — | — |
| Izod impact strength (−30° C.) | kJ/m² | — | — | — | — |

TABLE 4

|  |  |  |  | Example | | | | Comparative Example |
|---|---|---|---|---|---|---|---|---|
|  |  |  |  | 15 | 16 | 17 | 18 | 4 |
| PC-based resin (S) | (A) PC-POS | (A1) | Part(s) by mass |  |  |  |  |  |
|  |  | (A2) | Part(s) by mass | 45 |  |  |  |  |
|  |  | (A3) | Part(s) by mass |  | 9 |  |  |  |
|  |  | (A4) | Part(s) by mass |  |  | 11 |  |  |
|  |  | (A5) | Part(s) by mass |  |  |  | 45 |  |
|  | (B) GP-PC | (B1) FN2500 | Part(s) by mass | 15 | 15 | 15 | 15 |  |
|  |  | (B2) FN1700 | Part(s) by mass | 15 | 51 | 49 | 15 | 75 |
| (C) PE-based resin | (C1) DURANEX 2002 |  | Part(s) by mass | 25 | 25 | 25 | 25 | 25 |
|  | (C2) NOVADURAN 5010R3-2 |  | Part(s) by mass |  |  |  |  |  |
| (D) Amide compound | (D1) CDA-6 |  | Part(s) by mass | 0.06 | 0.06 | 0.06 | 0.06 | 0.1 |
|  | (D2) CDA-1 |  | Part(s) by mass | — | — | — | — | — |
|  | (D3) Phthalic hydrazide |  | Part(s) by mass | — | — | — | — | — |
| Others | Irgafos 168 |  | Part(s) by mass | 0.10 | 0.10 | 0.10 | 0.10 | 0.10 |
|  | Irganox 1076 |  | Part(s) by mass | 0.10 | 0.10 | 0.10 | 0.10 | 0.10 |
| Molecular weight Mv of polycarbonate-based resin (S) |  |  |  | 18,900 | 18,900 | 18,900 | 18,900 | 17,700 |
| PDMS block moiety content in polycarbonate-based resin (S) |  |  | mass % | 3.6 | 3.6 | 3.6 | 3.6 | 0 |
| Physical property | MVR (300° C., 1.2 kg) |  | ml/10 min | 44 | 38 | 40 | 42 | 54 |
|  | Q value (280° C, 160 kg) |  | ×0.01 ml/s | 24 | 22 | 22 | 24 | 28 |
|  | Izod impact strength (23° C.) |  | kJ/m² | 130 | 135 | 144 | 130 | 6 |
|  | Izod impact strength (0° C.) |  | kJ/m² | — | 106 | 128 | 104 | — |
|  | Izod impact strength (−10° C.) |  | kJ/m² | — | 100 | 115 | — | 7 |
|  | Izod impact strength (−20° C.) |  | kJ/m² | — | 88 | — | — | — |
|  | Izod impact strength (−30° C.) |  | kJ/m² | — | — | — | — | 7 |

Fluidity Evaluation (MVR)

The amount (ml/10 min) of a molten resin flowing out of a die having a diameter of 2.095±0.005 mm and a length of 8.000±0.025 mm was measured by using the above-mentioned pellet in conformity with JIS K 7210-1:2014 at 300° C. under a load of 1.2 kg.

Q Value (Flow Value) [unit; $10^{-2}$ mL/sec]

The amount ($10^{-2}$ mL/sec) of a molten resin flowing out of a nozzle having a diameter of 1.00 mm and a length of 10.00 mm was measured by using the above-mentioned pellet and a Koka flow tester in conformity with JIS K 7210-1:2014: Appendix JA at 280° C. under a pressure of 160 kgf. A Q value represents an outflow amount per unit time, and a higher numerical value therefor means that the fluidity of the resin is better.

Impact Resistance

The pellet obtained in the foregoing was dried at 100° C. for 8 hours, and was then subjected to injection molding with an injection molding machine (manufactured by Nissei Plastic Industrial Co., Ltd., NEX110, screw diameter: 36 mmφ) at a cylinder temperature of 280° C. and a die temperature of 80° C. to produce an Izod test piece (length: 63.5 mm, width: 12.7 mm, thickness: 3.2 mm). Notched Izod impact strengths at −30° C., −20° C., −10° C., 0° C., and 23° C. were measured by using a test piece obtained by making a notch (r=0.25 mm±0.05 mm, width of notched portion=10.2±0.2 mm) in the test piece through post-processing in conformity with ASTM Standard D-256.

INDUSTRIAL APPLICABILITY

The polycarbonate-based resin composition obtained in the present invention can be suitably used in exterior and internal parts for parts for electrical and electronic equipment, and parts and the like for an automobile and a building material because the composition is excellent in impact resistance.

The invention claimed is:

1. A polycarbonate-based resin composition, comprising:
    50 mass % or more to 99 mass % or less of a polycarbonate-based resin (S) containing 0.1 mass % or more to 100 mass % or less of a polycarbonate-polyorganosiloxane copolymer (A), which contains a polycarbonate block (A-1) formed of a repeating unit represented by the following general formula (I) and a polyorganosiloxane block (A-2) containing a repeating unit represented by the following general formula (II), and 0 mass % or more to 99.9 mass % or less of an aromatic polycarbonate-based resin (B) except the polycarbonate-polyorganosiloxane copolymer (A);
    1 mass % or more to 50 mass % or less of a polyester-based resin (C); and
    0.001 part by mass or more to 1 part by mass or less of an amide compound (D) with respect to 100 parts by mass of a total amount of the polycarbonate-based resin (S) and the polyester-based resin (C):

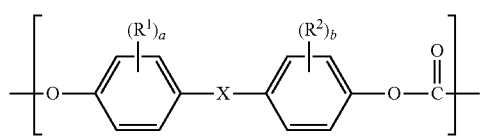

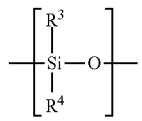

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4 wherein the amide compound (D) is a compound represented by the following general formula (IV):

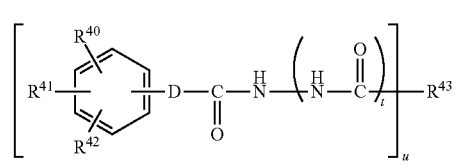

wherein, in the formula (IV), $R^{40}$, $R^{41}$, and $R^{42}$ each independently represent a hydrogen atom, a hydroxyl group, a linear or branched alkyl group having 1 to 8 carbon atoms, an alkoxy group having 1 to 8 carbon atoms, or an aryl group having 6 to 18 carbon atoms, or $R^{40}$, $R^{41}$, and $R^{42}$ are bonded to each other to represent a cyclic structure, provided that a number of carbon atoms of the cyclic structure is from 10 to 18 in terms of total number of carbon atoms of a fused ring, D represents a single bond or an alkylene group having 1 to 20 carbon atoms, $R^{43}$ represents a single bond, or a substituted or unsubstituted hydrocarbon group or heterocyclic group having 1 to 30 carbon atoms, and when $R^{43}$ represents a single bond, the single bond may be bonded to an aromatic ring to which D is bonded to form a ring, "t" represents 0 or 1, and "u" represents from 1 to 3, and when "u" represents 2 or more, the compound has a symmetric or asymmetric structure with respect to $R^{43}$.

2. The polycarbonate-based resin composition according to claim 1, wherein the polyorganosiloxane block (A-2) has an average chain length of from 20 or more to 500 or less.

3. The polycarbonate-based resin composition according to claim 1, wherein a content of the polyorganosiloxane block (A-2) in the polycarbonate- polyorganosiloxane copolymer (A) is from 1 mass % or more to 50 mass % or less.

4. The polycarbonate-based resin composition according to claim 1, wherein a content of the polyorganosiloxane block (A-2) in the polycarbonate-based resin (S) is from 0.1 mass % or more to 10 mass % or less.

5. The polycarbonate-based resin composition according to claim 1, wherein a content of the polyorganosiloxane block (A-2) in the polycarbonate-based resin composition is from 0.1 mass % or more to 10 mass % or less.

6. The polycarbonate-based resin composition according to claim 1, wherein the polycarbonate-polyorganosiloxane copolymer (A) has a viscosity-average molecular weight (Mv) of from 9,000 or more to 50,000 or less.

7. The polycarbonate-based resin composition according to claim 1, wherein the polycarbonate-based resin (S) has a viscosity-average molecular weight (Mv) of from 9,000 or more to 50,000 or less.

8. The polycarbonate-based resin composition according to claim 1, wherein the polyorganosiloxane block (A-2) has a unit represented by any one of the following general formulae (II-I) to (II-III):

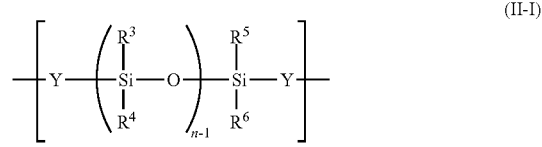
(II-I)

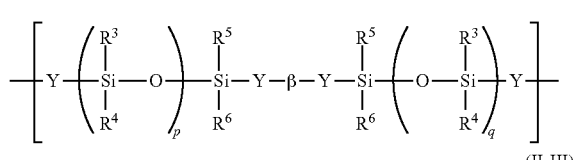
(II-II)

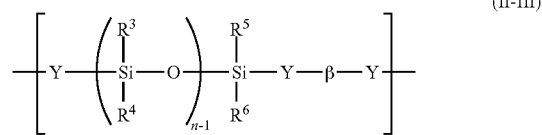
(II-III)

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, R4, $R^5$, or $R^6$ may be identical to or different from each other, Y represents —$R^7$O—, —$R^7$COO—, —$R^7$NH—, —$R^7NR^813$, —COO—, —S—, —$R^7$COO—$R^9$—O—, or —$R^7$O—$R^{10}$—O—, and a plurality of Y may be identical to or different from each other, the $R^7$ represents a single bond, a linear, branched, or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, R represents a linear, branched, or cyclic alkylene group, or a diarylene group, β represents a divalent group derived from a diisocyanate compound, or a divalent group derived from a dicarboxylic acid or a halide of a dicarboxylic acid, "n" represents a chain length of a polyorganosiloxane and needs to be from 20 or more to 500 or less, and n-1, and "p" and "q" each represent a number of repetitions of a polyorganosiloxane unit and each represent an integer of 1 or more, and a sum of "p" and "q" is n-2.

9. The polycarbonate-based resin composition according to claim 1, wherein the aromatic polycarbonate-based resin (B) contains a polycarbonate block including, in a main chain thereof, a repeating unit represented by the following general formula (III):

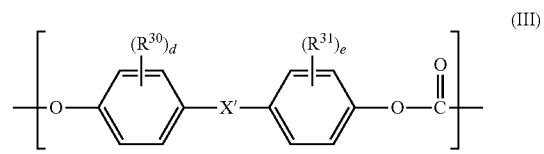
(III)

wherein $R^{30}$ and $R^{31}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —$SO_2$—, —O—, or —CO—, and "d" and "e" each independently represent an integer of from 0 to 4.

10. The polycarbonate-based resin composition according to claim 1, wherein the polyester-based resin (C) is a polybutylene terephthalate.

11. The polycarbonate-based resin composition according to claim 1, wherein an amount of titanium in the polyester-based resin (C) is 120 ppm by mass or less.

12. The polycarbonate-based resin composition according to claim 1, wherein an amount of tin in the polyester-based resin (C) is 50 ppm by mass or less.

13. The polycarbonate-based resin composition according to claim 1, wherein the amide compound (D) is a compound represented by the following general formula (V), (VI), or (VII):

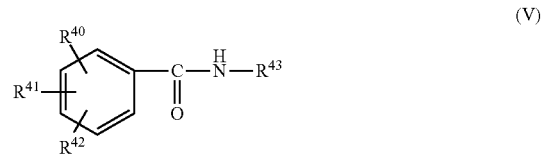
(V)

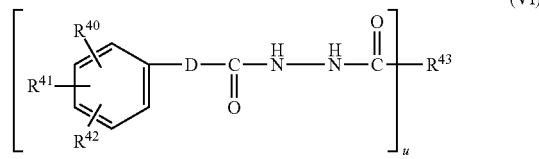
(VI)

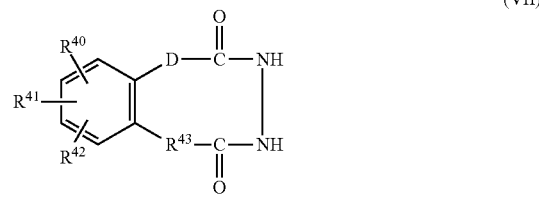
(VII)

wherein, in the formulae (V) to (VII), $R^{40}$, $R^{41}$, and $R^{42}$ each independently represent a hydrogen atom, a hydroxyl group, a linear or branched alkyl group having 1 to 8 carbon atoms, an alkoxy group having 1 to 8 carbon atoms, or an aryl group having 6 to 18 carbon atoms, or $R^{40}$, $R^{41}$, and $R^{42}$ are bonded to each other to represent a cyclic structure, provided that a number of carbon atoms of the cyclic structure is from 10 to 18 in terms of total number of carbon atoms of a fused ring, D represents a single bond or an alkylene group having 1 to 20 carbon atoms, $R^{43}$ represents a single bond, or a substituted or unsubstituted hydrocarbon group or heterocyclic group having 1 to 30 carbon atoms, and "u" represents from 1 to 3, and when "u" represents 2 or more, the compound has a symmetric or asymmetric structure with respect to R43.

14. The polycarbonate-based resin composition according to claim 1, wherein the amide compound (D) is a compound represented by the general formula (VI).

15. The polycarbonate-based resin composition according to claim 1, wherein the amide compound (D) is 1,10-decanedicarboxylic acid di(N'—salicyloylhydrazide).

16. The polycarbonate-based resin composition according to claim 1, wherein the amide compound (D) is 3-(N-salicyloyl)amino-1H-1,2,4-triazole.

17. The polycarbonate-based resin composition according to claim 1, wherein the amide compound (D) is phthalic acid hydrazide.

18. The polycarbonate-based resin composition according to claim 1, wherein the polycarbonate-based resin composition has a notched Izod impact strength at 23° C. of 70 kJ/m$^2$ or more, which is measured in conformity with ASTM Standard D-256.

19. A molded article, which is obtained by molding the polycarbonate-based resin composition of claim 1.

20. The molded article according to claim 19, wherein the molded article has a notched Izod impact strength at 23° C. of 70 kJ/m$^2$ or more, which is measured in conformity with ASTM Standard D-256.

21. The molded article according to claim 19, wherein the molded article is exterior and internal parts for parts for electrical and electronic equipment.

22. The molded article according to claim 19, wherein the molded article is parts for an automobile and a building material.

* * * * *